(12) United States Patent  (10) Patent No.: US 8,508,508 B2
Newton  (45) Date of Patent: Aug. 13, 2013

(54) TOUCH SCREEN SIGNAL PROCESSING WITH SINGLE-POINT CALIBRATION

(75) Inventor: John David Newton, Auckland (NZ)

(73) Assignee: Next Holdings Limited (NZ)

(*) Notice: Subject to any disclaimer, the term of this patent is extended or adjusted under 35 U.S.C. 154(b) by 525 days.

(21) Appl. No.: 12/709,803

(22) Filed: Feb. 22, 2010

(65) Prior Publication Data

US 2010/0207911 A1 Aug. 19, 2010

Related U.S. Application Data

(63) Continuation-in-part of application No. 12/578,165, filed on Oct. 13, 2009, which is a continuation of application No. 11/033,183, filed on Jan. 11, 2005, now Pat. No. 7,629,967, which is a continuation of application No. PCT/NZ2004/000029, filed on Feb. 16, 2004.

(30) Foreign Application Priority Data

Feb. 14, 2003 (NZ) ........................................ 524211

(51) Int. Cl.
G06F 3/042 (2006.01)
(52) U.S. Cl.
USPC ........... 345/175; 345/156; 345/158; 345/173; 345/178; 345/419; 348/61; 353/69; 353/70; 178/18.08; 178/18.09
(58) Field of Classification Search
USPC .................. 345/156, 73, 178, 175; 353/69, 353/70; 178/18.08, 18.09
See application file for complete search history.

(56) References Cited

U.S. PATENT DOCUMENTS 844,152 A 2/1907 Little
2,407,680 A 9/1946 Palmquist et al.
(Continued)

FOREIGN PATENT DOCUMENTS

AU 7225001 1/2002
AU 2003233728 12/2003
(Continued)

OTHER PUBLICATIONS

Anon, "SMART Board Specifications Model 680i", XP7915047 Retrieved from the Internet: URL:http://www2.smarttech.com/kbdoc/74231 [retrieved on Sep. 23, 2010] the whole document, 2008, pp. 1-5.

(Continued)

Primary Examiner — Alexander S. Beck
Assistant Examiner — Amen Bogale
(74) Attorney, Agent, or Firm — Kilpatrick Townsend & Stockton LLP

(57) ABSTRACT

A coordinate detection system can comprise a display screen, a touch surface corresponding the top of the display screen or a material positioned above the screen and defining a touch area, at least one camera outside the touch area and configured to capture an image of space above the touch surface, and a processor executing program code to identify whether an object interferes with the light from the light source projected through the touch surface based on the image captured by the at least one camera. The processor can be configured to carry out a calibration routine utilizing a single touch point in order to determine a plane corresponding to the touch surface by using mirror images of the features adjacent the touch surface, images of the features, and/or based on the touch point and a normal to the reflective plane defined by an image of the object and its mirror image.

26 Claims, 18 Drawing Sheets

(56) References Cited

U.S. PATENT DOCUMENTS

| | | |
|---|---|---|
| 2,769,374 A | 11/1956 | Sick |
| 3,025,406 A | 3/1962 | Stewart et al. |
| 3,128,340 A | 4/1964 | Harmon |
| 3,187,185 A | 6/1965 | Milnes |
| 3,360,654 A | 12/1967 | Muller |
| 3,478,220 A | 11/1969 | Milroy |
| 3,563,771 A | 2/1971 | Tung |
| 3,613,066 A | 10/1971 | Cooreman |
| 3,764,813 A | 10/1973 | Clement et al. |
| 3,775,560 A | 11/1973 | Ebeling et al. |
| 3,810,804 A | 5/1974 | Rowland |
| 3,830,682 A | 8/1974 | Rowland |
| 3,857,022 A | 12/1974 | Rebane et al. |
| 3,860,754 A | 1/1975 | Johnson et al. |
| 4,107,522 A | 8/1978 | Walter |
| 4,144,449 A | 3/1979 | Funk et al. |
| 4,243,618 A | 1/1981 | Van Arnam |
| 4,243,879 A | 1/1981 | Carroll et al. |
| 4,247,767 A | 1/1981 | O'Brien et al. |
| 4,329,037 A | 5/1982 | Caviness |
| 4,420,261 A | 12/1983 | Barlow et al. |
| 4,459,476 A | 7/1984 | Weissmueller et al. |
| 4,468,694 A | 8/1984 | Edgar |
| 4,486,363 A | 12/1984 | Pricone et al. |
| 4,507,557 A | 3/1985 | Tsikos |
| 4,542,375 A | 9/1985 | Alles et al. |
| 4,550,250 A | 10/1985 | Mueller et al. |
| 4,553,842 A | 11/1985 | Griffin |
| 4,558,313 A | 12/1985 | Garwin et al. |
| 4,601,861 A | 7/1986 | Pricone et al. |
| 4,672,364 A | 6/1987 | Lucas |
| 4,673,918 A | 6/1987 | Adler et al. |
| 4,688,933 A | 8/1987 | Lapeyre |
| 4,703,316 A | 10/1987 | Sherbeck |
| 4,710,760 A | 12/1987 | Kasday |
| 4,737,631 A | 4/1988 | Sasaki et al. |
| 4,742,221 A | 5/1988 | Sasaki et al. |
| 4,746,770 A | 5/1988 | McAvinney |
| 4,762,990 A | 8/1988 | Caswell et al. |
| 4,766,424 A | 8/1988 | Adler et al. |
| 4,782,328 A | 11/1988 | Denlinger |
| 4,811,004 A | 3/1989 | Person et al. |
| 4,818,826 A | 4/1989 | Kimura |
| 4,820,050 A | 4/1989 | Griffin |
| 4,822,145 A | 4/1989 | Staelin |
| 4,831,455 A | 5/1989 | Ishikawa et al. |
| 4,851,664 A | 7/1989 | Rieger |
| 4,868,551 A | 9/1989 | Arditty et al. |
| 4,868,912 A | 9/1989 | Doering |
| 4,888,479 A | 12/1989 | Tamaru |
| 4,893,120 A | 1/1990 | Doering et al. |
| 4,916,308 A | 4/1990 | Meadows |
| 4,928,094 A | 5/1990 | Smith |
| 4,943,806 A | 7/1990 | Masters et al. |
| 4,980,547 A | 12/1990 | Griffin |
| 4,990,901 A | 2/1991 | Beiswenger |
| 5,025,314 A | 6/1991 | Tang et al. |
| 5,025,411 A | 6/1991 | Tallman et al. |
| 5,043,751 A | 8/1991 | Rice |
| 5,097,516 A | 3/1992 | Amir |
| 5,103,085 A | 4/1992 | Zimmerman |
| 5,103,249 A | 4/1992 | Keene |
| 5,105,186 A | 4/1992 | May |
| 5,109,435 A | 4/1992 | Lo et al. |
| 5,130,794 A | 7/1992 | Ritchey |
| 5,140,647 A | 8/1992 | Ise et al. |
| 5,148,015 A | 9/1992 | Dolan |
| 5,162,618 A | 11/1992 | Knowles |
| 5,162,783 A | 11/1992 | Moreno |
| 5,164,714 A | 11/1992 | Wehrer |
| 5,168,531 A | 12/1992 | Sigel |
| 5,177,328 A | 1/1993 | Ito et al. |
| 5,179,369 A | 1/1993 | Person et al. |
| 5,196,835 A | 3/1993 | Blue et al. |
| 5,196,836 A | 3/1993 | Williams |
| 5,200,851 A | 4/1993 | Coderre et al. |
| 5,200,861 A | 4/1993 | Moskovich |
| 5,233,502 A | 8/1993 | Beatty et al. |
| 5,239,152 A | 8/1993 | Caldwell et al. |
| 5,239,373 A | 8/1993 | Tang et al. |
| 5,272,470 A | 12/1993 | Zetts |
| 5,317,140 A | 5/1994 | Dunthorn |
| 5,359,155 A | 10/1994 | Helser |
| 5,374,971 A | 12/1994 | Clapp et al. |
| 5,414,413 A | 5/1995 | Tamaru et al. |
| 5,422,494 A | 6/1995 | West et al. |
| 5,448,263 A | 9/1995 | Martin |
| 5,457,289 A | 10/1995 | Huang et al. |
| 5,483,261 A | 1/1996 | Yasutake |
| 5,483,603 A | 1/1996 | Luke et al. |
| 5,484,966 A | 1/1996 | Segen |
| 5,490,655 A | 2/1996 | Bates |
| 5,502,568 A | 3/1996 | Ogawa et al. |
| 5,525,764 A | 6/1996 | Junkins et al. |
| 5,528,263 A | 6/1996 | Platzker et al. |
| 5,528,290 A | 6/1996 | Saund |
| 5,537,107 A | 7/1996 | Funado |
| 5,541,372 A | 7/1996 | Baller et al. |
| 5,554,828 A | 9/1996 | Primm |
| 5,581,276 A | 12/1996 | Cipolla et al. |
| 5,581,637 A | 12/1996 | Cass et al. |
| 5,591,945 A | 1/1997 | Kent |
| 5,594,469 A | 1/1997 | Freeman et al. |
| 5,594,502 A | 1/1997 | Bito et al. |
| 5,617,312 A | 4/1997 | Iura et al. |
| 5,638,092 A | 6/1997 | Eng et al. |
| 5,670,755 A | 9/1997 | Kwon |
| 5,686,942 A | 11/1997 | Ball |
| 5,698,845 A | 12/1997 | Kodama et al. |
| 5,712,024 A | 1/1998 | Okuzaki et al. |
| 5,729,704 A | 3/1998 | Stone et al. |
| 5,734,375 A | 3/1998 | Knox et al. |
| 5,736,686 A | 4/1998 | Perret, Jr. et al. |
| 5,737,740 A | 4/1998 | Henderson et al. |
| 5,739,479 A | 4/1998 | Davis-Cannon et al. |
| 5,745,116 A | 4/1998 | Pisutha-Arnond |
| 5,764,223 A | 6/1998 | Chang et al. |
| 5,771,039 A | 6/1998 | Ditzik |
| 5,784,054 A | 7/1998 | Armstrong et al. |
| 5,785,439 A | 7/1998 | Bowen |
| 5,786,810 A | 7/1998 | Knox et al. |
| 5,790,910 A | 8/1998 | Haskin |
| 5,801,704 A | 9/1998 | Oohara et al. |
| 5,804,773 A | 9/1998 | Wilson et al. |
| 5,818,421 A | 10/1998 | Ogino et al. |
| 5,818,424 A | 10/1998 | Korth |
| 5,819,201 A | 10/1998 | DeGraaf |
| 5,825,352 A | 10/1998 | Bisset et al. |
| 5,831,602 A | 11/1998 | Sato et al. |
| 5,877,459 A | 3/1999 | Prater |
| 5,909,210 A | 6/1999 | Knox et al. |
| 5,911,004 A | 6/1999 | Ohuchi et al. |
| 5,914,709 A | 6/1999 | Graham et al. |
| 5,920,342 A | 7/1999 | Umeda et al. |
| 5,936,615 A | 8/1999 | Waters |
| 5,936,770 A | 8/1999 | Nestegard et al. |
| 5,940,065 A | 8/1999 | Babb et al. |
| 5,943,783 A | 8/1999 | Jackson |
| 5,963,199 A | 10/1999 | Kato et al. |
| 5,982,352 A | 11/1999 | Pryor |
| 5,988,645 A | 11/1999 | Downing |
| 5,990,874 A | 11/1999 | Tsumura et al. |
| 6,002,808 A | 12/1999 | Freeman |
| 6,008,798 A | 12/1999 | Mato, Jr. et al. |
| 6,015,214 A | 1/2000 | Heenan et al. |
| 6,020,878 A | 2/2000 | Robinson |
| 6,031,524 A | 2/2000 | Kunert |
| 6,031,531 A | 2/2000 | Kimble |
| 6,061,177 A | 5/2000 | Fujimoto |
| 6,067,080 A | 5/2000 | Holtzman |
| 6,075,905 A | 6/2000 | Herman et al. |
| 6,076,041 A | 6/2000 | Watanabe |
| 6,091,406 A | 7/2000 | Kambara et al. |
| 6,100,538 A | 8/2000 | Ogawa |

| | | | |
|---|---|---|---|
| 6,104,387 A | 8/2000 | Chery et al. |
| 6,118,433 A | 9/2000 | Jenkin et al. |
| 6,122,865 A | 9/2000 | Branc et al. |
| 6,128,003 A | 10/2000 | Smith et al. |
| 6,141,000 A | 10/2000 | Martin |
| 6,147,678 A | 11/2000 | Kumar et al. |
| 6,153,836 A | 11/2000 | Goszyk |
| 6,161,066 A | 12/2000 | Wright et al. |
| 6,179,426 B1 | 1/2001 | Rodriguez, Jr. et al. |
| 6,188,388 B1 | 2/2001 | Arita et al. |
| 6,191,773 B1 | 2/2001 | Maruno et al. |
| 6,208,329 B1 | 3/2001 | Ballare |
| 6,208,330 B1 | 3/2001 | Hasegawa et al. |
| 6,209,266 B1 | 4/2001 | Branc et al. |
| 6,215,477 B1 | 4/2001 | Morrison et al. |
| 6,222,175 B1 | 4/2001 | Krymski |
| 6,226,035 B1 | 5/2001 | Korein et al. |
| 6,229,529 B1 | 5/2001 | Yano et al. |
| 6,252,989 B1 | 6/2001 | Geisler et al. |
| 6,256,033 B1 | 7/2001 | Nguyen |
| 6,262,718 B1 | 7/2001 | Findlay et al. |
| 6,285,359 B1 | 9/2001 | Ogasawara et al. |
| 6,310,610 B1 | 10/2001 | Beaton et al. |
| 6,320,597 B1 | 11/2001 | Ieperen |
| 6,323,846 B1 | 11/2001 | Westerman et al. |
| 6,326,954 B1 | 12/2001 | Van Ieperen |
| 6,328,270 B1 | 12/2001 | Elberbaum |
| 6,335,724 B1 | 1/2002 | Takekawa et al. |
| 6,337,681 B1 | 1/2002 | Martin |
| 6,339,748 B1 | 1/2002 | Hiramatsu |
| 6,346,966 B1 | 2/2002 | Toh |
| 6,352,351 B1 | 3/2002 | Ogasahara et al. |
| 6,353,434 B1 | 3/2002 | Akebi et al. |
| 6,359,612 B1 | 3/2002 | Peter et al. |
| 6,362,468 B1 | 3/2002 | Murakami et al. |
| 6,377,228 B1 | 4/2002 | Jenkin et al. |
| 6,384,743 B1 | 5/2002 | Vanderheiden |
| 6,406,758 B1 | 6/2002 | Bottari et al. |
| 6,414,671 B1 | 7/2002 | Gillespie et al. |
| 6,414,673 B1 | 7/2002 | Wood et al. |
| 6,421,042 B1 | 7/2002 | Omura et al. |
| 6,427,389 B1 | 8/2002 | Branc et al. |
| 6,429,856 B1 | 8/2002 | Omura et al. |
| 6,429,857 B1 | 8/2002 | Masters et al. |
| 6,480,187 B1 | 11/2002 | Sano et al. |
| 6,496,122 B2 | 12/2002 | Sampsell |
| 6,497,608 B2 | 12/2002 | Ho et al. |
| 6,498,602 B1 | 12/2002 | Ogawa |
| 6,501,461 B2 | 12/2002 | Holtzman |
| 6,504,532 B1 | 1/2003 | Ogasahara et al. |
| 6,507,339 B1 | 1/2003 | Tanaka |
| 6,512,838 B1 | 1/2003 | Rafii et al. |
| 6,517,266 B2 | 2/2003 | Saund |
| 6,518,600 B1 | 2/2003 | Shaddock |
| 6,518,960 B2 | 2/2003 | Omura et al. |
| 6,522,830 B2 | 2/2003 | Yamagami |
| 6,529,189 B1 | 3/2003 | Colgan et al. |
| 6,530,664 B2 | 3/2003 | Vanderwerf et al. |
| 6,531,999 B1 | 3/2003 | Trajkovic |
| 6,532,006 B1 | 3/2003 | Takekawa et al. |
| 6,537,673 B2 | 3/2003 | Sada et al. |
| 6,540,366 B2 | 4/2003 | Keenan et al. |
| 6,540,679 B2 | 4/2003 | Slayton et al. |
| 6,545,669 B1 | 4/2003 | Kinawi et al. |
| 6,559,813 B1 | 5/2003 | DeLuca et al. |
| 6,563,491 B1 | 5/2003 | Omura |
| 6,567,078 B2 | 5/2003 | Ogawa |
| 6,567,121 B1 | 5/2003 | Kuno |
| 6,570,103 B1 | 5/2003 | Saka et al. |
| 6,570,612 B1 | 5/2003 | Saund et al. |
| 6,577,299 B1 | 6/2003 | Schiller et al. |
| 6,587,099 B2 | 7/2003 | Takekawa |
| 6,590,568 B1 | 7/2003 | Astala et al. |
| 6,594,023 B1 | 7/2003 | Omura et al. |
| 6,597,348 B1 | 7/2003 | Yamazaki et al. |
| 6,597,508 B2 | 7/2003 | Seino et al. |
| 6,603,867 B1 | 8/2003 | Sugino et al. |
| 6,608,619 B2 | 8/2003 | Omura et al. |
| 6,614,422 B1 | 9/2003 | Rafii et al. |
| 6,624,833 B1 | 9/2003 | Kumar et al. |
| 6,626,718 B2 | 9/2003 | Hiroki |
| 6,630,922 B2 | 10/2003 | Fishkin et al. |
| 6,633,328 B1 | 10/2003 | Byrd et al. |
| 6,650,318 B1 | 11/2003 | Arnon |
| 6,650,822 B1 | 11/2003 | Zhou |
| 6,664,952 B2 | 12/2003 | Iwamoto et al. |
| 6,670,985 B2 | 12/2003 | Karube et al. |
| 6,674,424 B1 | 1/2004 | Fujioka |
| 6,683,584 B2 | 1/2004 | Ronzani et al. |
| 6,690,357 B1 | 2/2004 | Dunton et al. |
| 6,690,363 B2 | 2/2004 | Newton |
| 6,690,397 B1 | 2/2004 | Daignault, Jr. |
| 6,710,770 B2 | 3/2004 | Tomasi et al. |
| 6,714,311 B2 | 3/2004 | Hashimoto |
| 6,720,949 B1 | 4/2004 | Pryor et al. |
| 6,727,885 B1 | 4/2004 | Ishino et al. |
| 6,736,321 B2 | 5/2004 | Tsikos et al. |
| 6,738,051 B2 | 5/2004 | Boyd et al. |
| 6,741,250 B1 | 5/2004 | Furlan et al. |
| 6,741,267 B1 | 5/2004 | Leperen |
| 6,747,636 B2 | 6/2004 | Martin |
| 6,756,910 B2 | 6/2004 | Ohba et al. |
| 6,760,009 B2 | 7/2004 | Omura et al. |
| 6,760,999 B2 | 7/2004 | Branc et al. |
| 6,767,102 B1 | 7/2004 | Heenan et al. |
| 6,774,889 B1 | 8/2004 | Zhang et al. |
| 6,803,906 B1 * | 10/2004 | Morrison et al. ............ 345/173 |
| 6,828,959 B2 | 12/2004 | Takekawa et al. |
| 6,864,882 B2 | 3/2005 | Newton |
| 6,909,425 B2 | 6/2005 | Matsuda et al. |
| 6,911,972 B2 | 6/2005 | Brinjes |
| 6,919,880 B2 | 7/2005 | Morrison et al. |
| 6,927,384 B2 | 8/2005 | Reime et al. |
| 6,933,981 B1 | 8/2005 | Kishida et al. |
| 6,947,029 B2 | 9/2005 | Katagiri et al. |
| 6,947,032 B2 * | 9/2005 | Morrison et al. ............ 345/173 |
| 6,952,202 B2 | 10/2005 | Hirabayashi |
| 6,954,197 B2 | 10/2005 | Morrison et al. |
| 6,972,401 B2 | 12/2005 | Akitt et al. |
| 6,972,753 B1 | 12/2005 | Kimura et al. |
| 7,002,555 B1 | 2/2006 | Jacobsen et al. |
| 7,007,236 B2 | 2/2006 | Dempski et al. |
| 7,015,418 B2 | 3/2006 | Cahill et al. |
| 7,030,861 B1 | 4/2006 | Westerman et al. |
| 7,057,647 B1 | 6/2006 | Monroe |
| 7,058,204 B2 | 6/2006 | Hildreth et al. |
| 7,075,054 B2 | 7/2006 | Iwamoto et al. |
| 7,084,857 B2 | 8/2006 | Lieberman et al. |
| 7,084,868 B2 | 8/2006 | Farag et al. |
| 7,098,392 B2 | 8/2006 | Sitrick et al. |
| 7,113,174 B1 | 9/2006 | Takekawa et al. |
| 7,121,470 B2 | 10/2006 | McCall et al. |
| 7,133,032 B2 | 11/2006 | Cok |
| 7,151,533 B2 | 12/2006 | Van Ieperen |
| 7,176,904 B2 | 2/2007 | Satoh |
| 7,184,030 B2 | 2/2007 | McCharles et al. |
| 7,187,489 B2 | 3/2007 | Miles |
| 7,190,496 B2 | 3/2007 | Klug et al. |
| 7,202,860 B2 | 4/2007 | Ogawa |
| 7,227,526 B2 | 6/2007 | Hildreth et al. |
| 7,230,608 B2 | 6/2007 | Cok |
| 7,232,986 B2 | 6/2007 | Worthington et al. |
| 7,236,132 B1 | 6/2007 | Lin et al. |
| 7,236,154 B1 | 6/2007 | Kerr et al. |
| 7,236,162 B2 | 6/2007 | Morrison et al. |
| 7,237,937 B2 | 7/2007 | Kawashima et al. |
| 7,242,388 B2 | 7/2007 | Lieberman et al. |
| 7,265,748 B2 | 9/2007 | Ryynanen |
| 7,268,692 B1 | 9/2007 | Lieberman |
| 7,274,356 B2 | 9/2007 | Ung et al. |
| 7,283,126 B2 | 10/2007 | Leung |
| 7,283,128 B2 | 10/2007 | Sato |
| 7,289,113 B2 | 10/2007 | Martin |
| 7,302,156 B1 | 11/2007 | Lieberman et al. |
| 7,305,368 B2 | 12/2007 | Lieberman et al. |
| 7,330,184 B2 | 2/2008 | Leung |
| 7,333,094 B2 | 2/2008 | Lieberman et al. |
| 7,333,095 B1 | 2/2008 | Lieberman et al. |

| | | |
|---|---|---|
| 7,355,593 B2 | 4/2008 | Hill et al. |
| 7,372,456 B2 | 5/2008 | McLintock |
| 7,375,720 B2 | 5/2008 | Tanaka |
| RE40,368 E | 6/2008 | Arnon |
| 7,411,575 B2 | 8/2008 | Hill et al. |
| 7,414,617 B2 | 8/2008 | Ogawa |
| 7,432,914 B2 | 10/2008 | Kobayashi et al. |
| 7,460,110 B2 | 12/2008 | Ung et al. |
| 7,477,241 B2 | 1/2009 | Lieberman et al. |
| 7,479,949 B2 | 1/2009 | Jobs et al. |
| 7,492,357 B2 | 2/2009 | Morrison et al. |
| 7,499,037 B2 | 3/2009 | Lube |
| 7,515,138 B2 | 4/2009 | Sullivan |
| 7,515,141 B2 | 4/2009 | Kobayashi |
| 7,522,156 B2 | 4/2009 | Sano et al. |
| 7,538,759 B2 | 5/2009 | Newton |
| 7,557,935 B2 | 7/2009 | Baruch |
| 7,559,664 B1 | 7/2009 | Walleman et al. |
| 7,619,617 B2 | 11/2009 | Morrison et al. |
| 7,629,967 B2 | 12/2009 | Newton |
| 7,692,625 B2 | 4/2010 | Morrison et al. |
| 7,751,671 B1 | 7/2010 | Newton et al. |
| 7,755,613 B2 | 7/2010 | Morrison et al. |
| 7,777,732 B2 | 8/2010 | Herz et al. |
| 7,781,722 B2 | 8/2010 | Lieberman et al. |
| 2001/0019325 A1 | 9/2001 | Takekawa |
| 2001/0022579 A1 | 9/2001 | Hirabayashi |
| 2001/0026268 A1 | 10/2001 | Ito |
| 2001/0033274 A1 | 10/2001 | Ong |
| 2001/0048169 A1 | 12/2001 | Nilsen et al. |
| 2001/0050677 A1 | 12/2001 | Tosaya |
| 2001/0055006 A1 | 12/2001 | Sano et al. |
| 2002/0008692 A1 | 1/2002 | Omura et al. |
| 2002/0015159 A1 | 2/2002 | Hashimoto |
| 2002/0036617 A1 | 3/2002 | Pryor |
| 2002/0041327 A1 | 4/2002 | Hildreth et al. |
| 2002/0050979 A1 | 5/2002 | Oberoi et al. |
| 2002/0064382 A1 | 5/2002 | Hildreth et al. |
| 2002/0067922 A1 | 6/2002 | Harris |
| 2002/0075243 A1 | 6/2002 | Newton |
| 2002/0080123 A1 | 6/2002 | Kennedy et al. |
| 2002/0118177 A1 | 8/2002 | Newton |
| 2002/0145595 A1 | 10/2002 | Satoh |
| 2002/0145596 A1 | 10/2002 | Vardi |
| 2002/0163505 A1 | 11/2002 | Takekawa |
| 2002/0163530 A1 | 11/2002 | Takakura et al. |
| 2003/0001825 A1 | 1/2003 | Omura et al. |
| 2003/0025951 A1 | 2/2003 | Pollard et al. |
| 2003/0034439 A1 | 2/2003 | Reime et al. |
| 2003/0043116 A1 | 3/2003 | Morrison et al. |
| 2003/0046401 A1 | 3/2003 | Abbott et al. |
| 2003/0063073 A1 | 4/2003 | Geaghan et al. |
| 2003/0071858 A1 | 4/2003 | Morohoshi |
| 2003/0085871 A1 | 5/2003 | Ogawa |
| 2003/0095112 A1 | 5/2003 | Kawano et al. |
| 2003/0137494 A1 | 7/2003 | Tulbert |
| 2003/0142880 A1 | 7/2003 | Hyodo |
| 2003/0147016 A1 | 8/2003 | Lin et al. |
| 2003/0151532 A1 | 8/2003 | Chen et al. |
| 2003/0151562 A1 | 8/2003 | Kulas |
| 2003/0156118 A1 | 8/2003 | Ayinde |
| 2003/0161524 A1 | 8/2003 | King |
| 2003/0227492 A1 | 12/2003 | Wilde et al. |
| 2004/0001144 A1 | 1/2004 | McCharles et al. |
| 2004/0012573 A1* | 1/2004 | Morrison et al. ............ 345/173 |
| 2004/0021633 A1 | 2/2004 | Rajkowski |
| 2004/0031779 A1 | 2/2004 | Cahill et al. |
| 2004/0032401 A1 | 2/2004 | Nakazawa et al. |
| 2004/0046749 A1 | 3/2004 | Ikeda |
| 2004/0051709 A1 | 3/2004 | Ogawa et al. |
| 2004/0108990 A1 | 6/2004 | Lieberman et al. |
| 2004/0125086 A1 | 7/2004 | Hagermoser et al. |
| 2004/0149892 A1 | 8/2004 | Akitt et al. |
| 2004/0150630 A1 | 8/2004 | Hinckley et al. |
| 2004/0169639 A1 | 9/2004 | Pate et al. |
| 2004/0178993 A1* | 9/2004 | Morrison et al. ............ 345/173 |
| 2004/0178997 A1 | 9/2004 | Gillespie et al. |
| 2004/0179001 A1 | 9/2004 | Morrison et al. |
| 2004/0189720 A1 | 9/2004 | Wilson et al. |
| 2004/0201575 A1* | 10/2004 | Morrison ............ 345/173 |
| 2004/0204129 A1 | 10/2004 | Payne et al. |
| 2004/0218479 A1 | 11/2004 | Iwamoto et al. |
| 2004/0221265 A1 | 11/2004 | Leung et al. |
| 2004/0252091 A1 | 12/2004 | Ma et al. |
| 2005/0020612 A1 | 1/2005 | Gericke |
| 2005/0030287 A1 | 2/2005 | Sato |
| 2005/0052427 A1 | 3/2005 | Wu et al. |
| 2005/0057524 A1 | 3/2005 | Hill et al. |
| 2005/0077452 A1 | 4/2005 | Morrison et al. |
| 2005/0083308 A1 | 4/2005 | Homer et al. |
| 2005/0104860 A1 | 5/2005 | McCreary et al. |
| 2005/0128190 A1 | 6/2005 | Ryynanen |
| 2005/0151733 A1 | 7/2005 | Sander et al. |
| 2005/0156900 A1 | 7/2005 | Hill et al. |
| 2005/0178953 A1 | 8/2005 | Worthington et al. |
| 2005/0190162 A1 | 9/2005 | Newton |
| 2005/0218297 A1 | 10/2005 | Suda et al. |
| 2005/0241929 A1 | 11/2005 | Auger et al. |
| 2005/0243070 A1 | 11/2005 | Ung et al. |
| 2005/0248539 A1 | 11/2005 | Morrison et al. |
| 2005/0248540 A1 | 11/2005 | Newton |
| 2005/0270781 A1 | 12/2005 | Marks |
| 2005/0276448 A1 | 12/2005 | Pryor |
| 2006/0012579 A1 | 1/2006 | Sato |
| 2006/0022962 A1 | 2/2006 | Morrison et al. |
| 2006/0028456 A1 | 2/2006 | Kang |
| 2006/0033751 A1 | 2/2006 | Keely et al. |
| 2006/0034486 A1 | 2/2006 | Morrison et al. |
| 2006/0070187 A1 | 4/2006 | Chilson |
| 2006/0132432 A1 | 6/2006 | Bell |
| 2006/0139314 A1 | 6/2006 | Bell |
| 2006/0152500 A1 | 7/2006 | Weng |
| 2006/0158437 A1 | 7/2006 | Blythe et al. |
| 2006/0170658 A1 | 8/2006 | Nakamura et al. |
| 2006/0197749 A1 | 9/2006 | Popovich |
| 2006/0202953 A1 | 9/2006 | Pryor et al. |
| 2006/0202974 A1 | 9/2006 | Thielman |
| 2006/0227120 A1 | 10/2006 | Eikman |
| 2006/0232568 A1 | 10/2006 | Tanaka et al. |
| 2006/0232830 A1 | 10/2006 | Kobayashi |
| 2006/0244734 A1 | 11/2006 | Hill et al. |
| 2006/0274067 A1 | 12/2006 | Hidai |
| 2006/0279558 A1 | 12/2006 | Van Delden et al. |
| 2006/0284858 A1 | 12/2006 | Rekimoto |
| 2007/0002028 A1 | 1/2007 | Morrison et al. |
| 2007/0019103 A1 | 1/2007 | Lieberman et al. |
| 2007/0059520 A1 | 3/2007 | Hatin et al. |
| 2007/0075648 A1 | 4/2007 | Blythe et al. |
| 2007/0075982 A1 | 4/2007 | Morrison et al. |
| 2007/0089915 A1 | 4/2007 | Ogawa et al. |
| 2007/0116333 A1 | 5/2007 | Dempski et al. |
| 2007/0126755 A1 | 6/2007 | Zhang et al. |
| 2007/0132742 A1 | 6/2007 | Chen et al. |
| 2007/0139932 A1 | 6/2007 | Sun et al. |
| 2007/0152977 A1 | 7/2007 | Ng et al. |
| 2007/0152984 A1 | 7/2007 | Ording et al. |
| 2007/0152986 A1 | 7/2007 | Ogawa |
| 2007/0160362 A1 | 7/2007 | Mitsuo et al. |
| 2007/0165007 A1 | 7/2007 | Morrison et al. |
| 2007/0167709 A1 | 7/2007 | Slayton et al. |
| 2007/0205994 A1 | 9/2007 | Van Ieperen |
| 2007/0215451 A1 | 9/2007 | Sasloff et al. |
| 2007/0236454 A1 | 10/2007 | Ung et al. |
| 2007/0247435 A1 | 10/2007 | Benko et al. |
| 2007/0273842 A1 | 11/2007 | Morrison et al. |
| 2008/0012835 A1 | 1/2008 | Rimon et al. |
| 2008/0029691 A1 | 2/2008 | Han |
| 2008/0042999 A1 | 2/2008 | Martin |
| 2008/0055262 A1 | 3/2008 | Wu et al. |
| 2008/0055267 A1 | 3/2008 | Wu et al. |
| 2008/0062140 A1 | 3/2008 | Hotelling et al. |
| 2008/0062149 A1 | 3/2008 | Baruk |
| 2008/0068352 A1 | 3/2008 | Worthington et al. |
| 2008/0083602 A1 | 4/2008 | Auger et al. |
| 2008/0103267 A1 | 5/2008 | Hurst et al. |
| 2008/0106706 A1 | 5/2008 | Holmgren et al. |
| 2008/0122803 A1 | 5/2008 | Izadi et al. |
| 2008/0129707 A1 | 6/2008 | Pryor |

| | | | | | |
|---|---|---|---|---|---|
| 2008/0143682 A1 | 6/2008 | Shim et al. | CA | 2606863 | 11/2006 |
| 2008/0150913 A1 | 6/2008 | Bell et al. | CA | 2580046 | 9/2007 |
| 2008/0158170 A1 | 7/2008 | Herz et al. | CA | 2515955 | 1/2011 |
| 2008/0259050 A1 | 10/2008 | Lin et al. | CN | 1277349 | 12/2000 |
| 2008/0259052 A1 | 10/2008 | Lin et al. | CN | 1407506 | 4/2003 |
| 2008/0259053 A1 | 10/2008 | Newton | CN | 1440539 | 9/2003 |
| 2008/0297595 A1* | 12/2008 | Hildebrandt et al. ............ 348/61 | CN | 1774692 | 5/2006 |
| 2009/0030853 A1 | 1/2009 | De La Motte | CN | 1784649 | 6/2006 |
| 2009/0058832 A1 | 3/2009 | Newton | CN | 1310126 | 4/2007 |
| 2009/0058833 A1 | 3/2009 | Newton | CN | 101019096 | 8/2007 |
| 2009/0077504 A1 | 3/2009 | Bell et al. | CN | 101023582 | 8/2007 |
| 2009/0122027 A1 | 5/2009 | Newton | CN | 101663637 | 3/2010 |
| 2009/0135162 A1 | 5/2009 | Van De Wijdeven et al. | CN | 101802759 | 8/2010 |
| 2009/0141002 A1 | 6/2009 | Sohn et al. | CN | 101802760 | 8/2010 |
| 2009/0146972 A1* | 6/2009 | Morrison et al. ............ 345/175 | DE | 3836429 | 5/1990 |
| 2009/0207144 A1 | 8/2009 | Bridger | DE | 19810452 | 12/1998 |
| 2009/0213093 A1 | 8/2009 | Bridger | DE | 60124549 | 9/2007 |
| 2009/0213094 A1 | 8/2009 | Bridger | DE | 102007021537 | 6/2008 |
| 2009/0219256 A1 | 9/2009 | Newton | EP | 0125068 | 11/1984 |
| 2009/0237376 A1 | 9/2009 | Bridger | EP | 0181196 | 5/1986 |
| 2009/0278816 A1 | 11/2009 | Colson | EP | 0279652 | 8/1988 |
| 2009/0284495 A1 | 11/2009 | Geaghan et al. | EP | 0347725 | 12/1989 |
| 2009/0295755 A1 | 12/2009 | Chapman et al. | EP | 0420335 | 4/1991 |
| 2009/0309844 A1 | 12/2009 | Woo et al. | EP | 0657841 | 6/1995 |
| 2009/0309853 A1 | 12/2009 | Hildebrandt et al. | EP | 0762319 | 3/1997 |
| 2010/0009098 A1 | 1/2010 | Bai et al. | EP | 0829798 | 3/1998 |
| 2010/0045629 A1 | 2/2010 | Newton | EP | 0843202 | 5/1998 |
| 2010/0045634 A1 | 2/2010 | Su et al. | EP | 0897161 | 2/1999 |
| 2010/0079412 A1 | 4/2010 | Chiang et al. | EP | 0911721 | 4/1999 |
| 2010/0085330 A1 | 4/2010 | Newton | EP | 1059605 | 12/2000 |
| 2010/0090985 A1 | 4/2010 | Newton | EP | 1262909 | 12/2002 |
| 2010/0090987 A1 | 4/2010 | Lin et al. | EP | 1297488 | 4/2003 |
| 2010/0097353 A1 | 4/2010 | Newton | EP | 1420335 | 5/2004 |
| 2010/0103143 A1 | 4/2010 | Newton et al. | EP | 1450243 | 8/2004 |
| 2010/0110005 A1* | 5/2010 | Chtchetinine et al. ........ 345/158 | EP | 1457870 | 9/2004 |
| 2010/0177052 A1 | 7/2010 | Chang et al. | EP | 1471459 | 10/2004 |
| 2010/0182279 A1 | 7/2010 | Juni | EP | 1517228 | 3/2005 |
| 2010/0193259 A1 | 8/2010 | Wassvik | EP | 1550940 | 7/2005 |
| 2010/0225588 A1 | 9/2010 | Newton et al. | EP | 1577745 | 9/2005 |
| 2010/0229090 A1 | 9/2010 | Newton et al. | EP | 1599789 | 11/2005 |
| 2010/0315379 A1 | 12/2010 | Allard et al. | EP | 1611503 | 1/2006 |
| 2011/0019204 A1 | 1/2011 | Bridger | EP | 1674977 | 6/2006 |
| 2011/0050649 A1 | 3/2011 | Newton et al. | EP | 1736856 | 12/2006 |
| 2011/0095977 A1* | 4/2011 | Ung ............................ 345/158 | EP | 1739528 | 1/2007 |
| 2011/0199335 A1 | 8/2011 | Li et al. | EP | 1739529 | 1/2007 |
| 2011/0199387 A1 | 8/2011 | Newton | EP | 1741186 | 1/2007 |
| 2011/0205151 A1 | 8/2011 | Newton et al. | EP | 1759378 | 3/2007 |
| 2011/0205155 A1 | 8/2011 | Newton et al. | EP | 1766501 | 3/2007 |
| 2011/0205185 A1 | 8/2011 | Newton et al. | EP | 1830248 | 9/2007 |
| 2011/0205186 A1 | 8/2011 | Newton et al. | EP | 1877893 | 1/2008 |
| | | | EP | 2135155 | 12/2009 |
| FOREIGN PATENT DOCUMENTS | | | EP | 2195726 | 6/2010 |
| AU | 2004211738 | 8/2004 | EP | 2250546 | 11/2010 |
| AU | 2006243730 | 11/2006 | ES | 2279823 | 9/2007 |
| CA | 2058219 | 4/1993 | FR | 2521330 | 8/1983 |
| CA | 2367864 | 4/1993 | GB | 1575420 | 9/1980 |
| CA | 2219886 | 4/1999 | GB | 2176282 | 12/1986 |
| CA | 2251221 | 4/1999 | GB | 2204126 | 11/1988 |
| CA | 2267733 | 10/1999 | GB | 2263765 | 8/1993 |
| CA | 2268208 | 10/1999 | JP | 57211637 | 12/1982 |
| CA | 2252302 | 4/2000 | JP | 58146928 | 9/1983 |
| CA | 2412878 | 1/2002 | JP | 61196317 | 8/1986 |
| CA | 2341918 | 9/2002 | JP | 61260322 | 11/1986 |
| CA | 2350152 | 12/2002 | JP | 62005428 | 1/1987 |
| CA | 2386094 | 12/2002 | JP | 63223819 | 9/1988 |
| CA | 2372868 | 8/2003 | JP | 1061736 | 3/1989 |
| CA | 2390503 | 12/2003 | JP | 1154421 | 6/1989 |
| CA | 2390506 | 12/2003 | JP | 3054618 | 3/1991 |
| CA | 2432770 | 12/2003 | JP | 3244017 | 10/1991 |
| CA | 2493236 | 12/2003 | JP | 4350715 | 12/1992 |
| CA | 2448603 | 5/2004 | JP | 4355815 | 12/1992 |
| CA | 2453873 | 7/2004 | JP | 5181605 | 7/1993 |
| CA | 2460449 | 9/2004 | JP | 5189137 | 7/1993 |
| CA | 2521418 | 10/2004 | JP | 5197810 | 8/1993 |
| CA | 2481396 | 3/2005 | JP | 6110608 | 4/1994 |
| CA | 2491582 | 7/2005 | JP | 7110733 | 4/1995 |
| CA | 2563566 | 11/2005 | JP | 7160403 | 6/1995 |
| CA | 2564262 | 11/2005 | JP | 7230352 | 8/1995 |
| CA | 2501214 | 9/2006 | JP | 8016931 | 2/1996 |

| | | |
|---|---|---|
| JP | 8108689 | 4/1996 |
| JP | 8506193 | 7/1996 |
| JP | 8240407 | 9/1996 |
| JP | 8315152 | 11/1996 |
| JP | 9091094 | 4/1997 |
| JP | 9224111 | 8/1997 |
| JP | 9319501 | 12/1997 |
| JP | 10031546 | 2/1998 |
| JP | 10105324 | 4/1998 |
| JP | 10162698 | 6/1998 |
| JP | 10254623 | 9/1998 |
| JP | 11045155 | 2/1999 |
| JP | 11051644 | 2/1999 |
| JP | 11064026 | 3/1999 |
| JP | 11085376 | 3/1999 |
| JP | 11110116 | 4/1999 |
| JP | 11203042 | 7/1999 |
| JP | 11212692 | 8/1999 |
| JP | 11338687 | 12/1999 |
| JP | 2000105671 | 4/2000 |
| JP | 2000132340 | 5/2000 |
| JP | 2000259347 | 9/2000 |
| JP | 2001014091 | 1/2001 |
| JP | 2001075735 | 3/2001 |
| JP | 2001142642 | 5/2001 |
| JP | 2001166874 | 6/2001 |
| JP | 2001282445 | 10/2001 |
| JP | 2001282456 | 10/2001 |
| JP | 2001282457 | 10/2001 |
| JP | 2002055770 | 2/2002 |
| JP | 2002116428 | 4/2002 |
| JP | 2002196874 | 7/2002 |
| JP | 2002236547 | 8/2002 |
| JP | 2002287886 | 10/2002 |
| JP | 2003065716 | 3/2003 |
| JP | 2003158597 | 5/2003 |
| JP | 2003167669 | 6/2003 |
| JP | 2003173237 | 6/2003 |
| JP | 2003303046 | 10/2003 |
| JP | 2003533786 | 11/2003 |
| JP | 2004030003 | 1/2004 |
| JP | 2004502261 | 1/2004 |
| JP | 2005108211 | 4/2005 |
| JP | 2005182423 | 7/2005 |
| JP | 2005202950 | 7/2005 |
| JP | 2006522967 | 10/2006 |
| JP | 2007536652 | 12/2007 |
| KR | 1020050111324 | 11/2005 |
| WO | WO8901677 | 2/1989 |
| WO | WO9807112 | 2/1998 |
| WO | WO9908897 | 2/1999 |
| WO | WO9921122 | 4/1999 |
| WO | WO9928812 | 6/1999 |
| WO | WO9936805 | 7/1999 |
| WO | WO9940562 | 8/1999 |
| WO | WO0021023 | 4/2000 |
| WO | WO0124157 | 4/2001 |
| WO | WO0131570 | 5/2001 |
| WO | WO0163550 | 8/2001 |
| WO | WO0186586 | 11/2001 |
| WO | WO0191043 | 11/2001 |
| WO | WO0203316 | 1/2002 |
| WO | WO0207073 | 1/2002 |
| WO | WO0208881 | 1/2002 |
| WO | WO0221502 | 3/2002 |
| WO | WO0227461 | 4/2002 |
| WO | WO03104887 | 12/2003 |
| WO | WO03105074 | 12/2003 |
| WO | WO2004072843 | 8/2004 |
| WO | WO2004090706 | 10/2004 |
| WO | WO2004102523 | 11/2004 |
| WO | WO2004104810 | 12/2004 |
| WO | WO2005031554 | 4/2005 |
| WO | WO2005034027 | 4/2005 |
| WO | WO2005106775 | 11/2005 |
| WO | WO2005107072 | 11/2005 |
| WO | WO2005109396 | 11/2005 |
| WO | WO2006002544 | 1/2006 |
| WO | WO2006092058 | 9/2006 |
| WO | WO2006095320 | 9/2006 |
| WO | WO2006096962 | 9/2006 |
| WO | WO2006116869 | 11/2006 |
| WO | WO2007003196 | 1/2007 |
| WO | WO2007019600 | 2/2007 |
| WO | WO2007037809 | 4/2007 |
| WO | WO2007064804 | 6/2007 |
| WO | WO2007079590 | 7/2007 |
| WO | WO2007132033 | 11/2007 |
| WO | WO2007134456 | 11/2007 |
| WO | WO2008007276 | 1/2008 |
| WO | WO2008085789 | 7/2008 |
| WO | WO2008128096 | 10/2008 |
| WO | WO2009029764 | 3/2009 |
| WO | WO2009029767 | 3/2009 |
| WO | WO2009035705 | 3/2009 |
| WO | WO2009102681 | 8/2009 |
| WO | WO2009137355 | 11/2009 |
| WO | WO2009146544 | 12/2009 |
| WO | WO2010039663 | 4/2010 |
| WO | WO2010039932 | 4/2010 |
| WO | WO2010044575 | 4/2010 |
| WO | WO2010051633 | 5/2010 |
| WO | WO2010110681 | 9/2010 |
| WO | WO2010110683 | 9/2010 |

OTHER PUBLICATIONS

Benko, et al., "Precise Selection Techniques for Multi-Touch Screens", *Conference on Human Factors in Computing Systems—Proceedings 2006*, 2: 1263-1273.

Buxton, et al., "Issues and Techniques in Touch-Sensitive Tablet Input", *Computer Graphics, Proceedings of SIGGRAPH'85*, 1985, 19(3): 215-223.

Canadian Patent Application No. 2412878, Office Action, mailed May 12, 2009, 4 pages.

"Composite List of Projects 1983 to 1989", *NASA Small Business Innovation Research Program*, Aug. 1990, 132 pages.

"Digital Vision Touch Technology", White Paper, *SMART Technologies Inc.*, Feb. 2003, 10 pages.

European Application No. 02253594.2, European Search Report, mailed Jan. 5, 2006, 3 pages.

European Application No. 03257166.3, Partial European Search Report, mailed May 29, 2006, 4 pages.

European Application No. 04251392.9, European Search Report, mailed Jan. 18, 2007, 3 pages.

European Application No. 04711522.5, Office Action, mailed Jun. 29, 2010, 8 pages.

European Application No. 04711522.5, Office Action, mailed Mar. 22, 2010, 1 page.

European Application No. 04711522.5, Supplementary European Search Report, mailed Mar. 3, 2010, 3 pages.

European Application No. 06019268.9, European Search Report and Search Opinion, mailed Nov. 24, 2006, 5 pages.

European Application No. 06019269.7, European Search Report and Search Opinion, mailed Nov. 23, 2006, 5 pages.

European Application No. 07250888.0, European Search Report and Search Opinion, mailed Jun. 22, 2007, 6 pages.

European Application No. 07701682.2, Supplementary European Search Report and Search Opinion, mailed Dec. 7, 2010, 10 pages.

European Application No. 08745663.8, Office Action, mailed Dec. 27, 2010, 13 pages.

European Application No. 08745663.8, Office Action, mailed Jul. 6, 2010, 6 pages.

Förstner, "On Estimating Rotations", *Institut für Photogrammetrie, Universität Bonn*, 12 pages.

Fukushige, et al., "Interactive 3D Pointing Device Using Mirror Reflections", *Graduate School of Engineering, Osaka University*, 2006, 231-235.

Funk, "CCDs in optical touch panels deliver high resolution", *Electronic Design*, Sep. 27, 1980, pp. 139-143.

Geer, "Will Gesture-Recognition Technology Point the Way?", *Industry Trends*, Oct. 2004, 20-23.

Hartley, "Multiple View Geometry in Computer Vision", *Cambridge University Press* First published 2000, Reprinted (with corrections) 2001, pp. 70-73, 92-93, and 98-99.

Heddier Electronic, "Store Window Presentations", Feb. 2, 2011, 2 pages.

Herot, et al., "One-Point Touch Input of Vector Information for Computer Displays", *Architecture Machine Group Massachusetts Institute of Technology* Cambridge, Massachusetts, Oct. 31, 1977, pp. 210-216.

Herrero, et al., "Background Subtraction Techniques: Systematic Evaluation and Comparative Analysis", *Advanced Concepts for Intelligent Vision Systems*, Springer-Verlag Berlin Heidelberg, Sep. 2009, pp. 33-42.

Hu, et al., "Multiple-view 3-D Reconstruction Using a Mirror", *The University of Rochester*, May 2005, 14 pages.

International Application No. PCT/CA2001/00980, International Search Report, mailed Oct. 22, 2001, 3 pages.

International Application No. PCT/CA2004/001759, International Search Report and Written Opinion, mailed Feb. 21, 2005, 7 pages.

International Application No. PCT/CA2007/002184, International Search Report, mailed Mar. 13, 2008, 3 pages.

International Application No. PCT/CA2008/001350, International Search Report, mailed Oct. 17, 2008, 5 pages.

International Application No. PCT/CA2009/000733, International Search Report and Written Opinion, mailed Sep. 10, 2009, 6 pages.

International Application No. PCT/CA2010/001085, International Search Report, mailed Oct. 12, 2010, 4 pages.

International Application No. PCT/NZ2004/000029, International Preliminary Report on Patentability, issued May 20, 2005, 21 pages.

International Application No. PCT/NZ2004/000029, International Search Report and Written Opinion, mailed Jun. 10, 2004, 6 pages.

International Application No. PCT/NZ2005/000092, International Preliminary Report on Patentability, completed Dec. 30, 2006, 3 pages.

International Application No. PCT/NZ2005/000092, International Search Report, mailed Sep. 27, 2006, 4 pages.

International Application No. PCT/NZ2010/000049, International Search Report and Written Opinion, mailed Oct. 14, 2010, 12 pages.

International Application No. PCT/NZ2010/000051, International Search Report and Written Opinion, mailed Oct. 5, 2010, 15 pages.

International Application No. PCT/US2008/060102, International Preliminary Report on Patentability, mailed Oct. 22, 2009, 10 pages.

International Application No. PCT/US2008/060102, International Search Report and Written Opinion, mailed Feb. 12, 2009, 20 pages.

International Application No. PCT/US2008/074749, International Preliminary Report on Patentability, issuance Mar. 2, 2010, 9 pages.

International Application No. PCT/US2008/074749, International Search Report and Written Opinion, mailed Feb. 11, 2009, 15 pages.

International Application No. PCT/US2008/074755, International Preliminary Report on Patentability, issuance Mar. 2, 2010, 8 pages.

International Application No. PCT/US2008/074755, International Search Report and Written Opinion, mailed Jan. 29, 2009, 8 pages.

International Application No. PCT/US2009/030694, International Preliminary Report on Patentability, completion Apr. 26, 2010, 10 pages.

International Application No. PCT/US2009/030694, International Search Report, mailed Aug. 5, 2009, 5 pages.

International Application No. PCT/US2009/033624, International Preliminary Report on Patentability and Written Opinion, issuance Aug. 17, 2010, 6 pages.

International Application No. PCT/US2009/033624, International Search Report, mailed Mar. 29, 2010, 3 pages.

International Application No. PCT/US2009/042547, International Preliminary Report on Patentability, mailed Nov. 9, 2010, 6 pages.

International Application No. PCT/US2009/042547, International Search Report and Written Opinion, mailed Sep. 2, 2010, 12 pages.

International Application No. PCT/US2009/058682, International Search Report and Written Opinion, mailed Apr. 27, 2010, 15 pages.

International Application No. PCT/US2009/059193, International Search Report and Written Opinion, mailed Dec. 7, 2009, 15 pages.

International Application No. PCT/US2010/059050, International Search Report and Written Opinion, mailed Mar. 23, 2011, 9 pages.

International Application No. PCT/US2010/059104, International Search Report and Written Opinion, mailed Jun. 6, 2011, 14 pages.

International Application No. PCT/US2010/059078, International Search Report and Written Opinion, mailed Aug. 2, 2011, 17 pages.

"Introducing the NextWindow 1900 Optical Touch Screen", *A NextWindow White Paper, Next Window Human Touch*, May 22, 2007, 13 pages.

Intuiface Press Release, "IntuiLab introduces IntuiFace, an interactive table and its application platform", Nov. 30, 2007, 1 page.

Intuilab, "Overview Page", Mar. 9, 2011, 1 page.

Japanese Patent Application No. 2005-000268, Office Action, mailed Jul. 5, 2010, Office Action—3 pages, English Translation—3 pages.

Japanese Patent Application No. 2006-502767, Office Action, mailed Jan. 20, 2009, Office Action—2 pages, English Translation—3 pages.

Japanese Patent Application No. 2006-502767, Office Action, mailed Jun. 22, 2010, Office Action—3 pages, English Translation—4 pages.

Japanese Patent Application No. 2007-511305, Office Action, mailed Feb. 1, 2011, Office Action—2 pages, English Translation—5 pages.

Japanese Patent Application No. 2007-511305, Office Action, mailed Sep. 6, 2011, Office Action—3 pages, English Translation—4 pages.

Kanatani, "Camera Calibration", *Geometric Computation for Machine Vision*, Oxford Engineering Science Series, 1993, 37(2): 56-63.

Korean Patent Application No. 10-2005-7014885, Office Action, dated Aug. 9, 2010, English Translation—5 pages.

Lane, et al., "Reflective Interaction in Virtual Environments", *Eurographics*, 2001, 20(3): 7 pages.

Lo, "Solid-state image sensor: technologies and applications", SPIE Proceedings, 1998, 3422: 70-80.

Loinaz, et al., "A 200-mW, 3.3-V, CMOS Color Camera IC Producing 352 × 288 24-b Video at 30 Frames", *IEEE Journal of Solid-State Circuits*, Dec. 1998, 33(12); 2092-2103.

Piccardi, et al., "Background subtraction techniques: a review", *2004 IEEE International Conference on Systems, Man and Cybernetics*, Oct. 10, 2004, 4: 3099-3104.

Pogue, "The Multi-Touch Screen", *Pogue's Posts*, Mar. 27, 2007, 13 pages.

Singapore Patent Application No. 201001122-9, Office Action, dated May 3, 2011, 9 pages.

Tappert, et al., "On-Line Handwriting Recognition—A Survey", *Proceedings of the 9th International Conference on Pattern Recognition (ICPR)*, Rome, IEEE Computer Society Press, Nov. 14-17, 1988, 2: 1123-1132.

"ThruGlass™ Projected Capacitive Touchscreens Specifications", *Micro Touch*, 2000, 4 pages.

"Touch Panel", *Veritas et Visus*, Nov. 2005, vol. 1, No. 1.
"Touch Panel", *Veritas et Visus*, Dec. 2005, Issue 2 of 10.
"Touch Panel", *Veritas et Visus*, Feb. 2006, vol. 1, No. 3.
"Touch Panel", *Veritas et Visus*, Mar. 2006, vol. 1, No. 4.
"Touch Panel", *Veritas et Visus*, May 2006, vol. 1, No. 5.
"Touch Panel", *Veritas et Visus*, Jun. 2006, vol. 1, No. 6.
"Touch Panel", *Veritas et Visus*, Jul. 2006, vol. 1, No. 7.
"Touch Panel", *Veritas et Visus*, Aug. 2006, vol. 1, No. 8.
"Touch Panel", *Veritas et Visus*, Oct. 2006, vol. 1, No. 9.
"Touch Panel", *Veritas et Visus*, Nov. 2006, vol. 1, No. 10.
"Touch Panel", *Veritas et Visus*, Dec. 2006, vol. 2, No. 1.
"Touch Panel", *Veritas et Visus*, Feb. 2007, vol. 2, No. 2.
"Touch Panel", *Veritas et Visus*, Mar. 2007, vol. 2, No. 3.
"Touch Panel", *Veritas et Visus*, May 2007, vol. 2, No. 4.
"Touch Panel", *Veritas et Visus*, Jul. 2007, vol. 2, No. 5.
"Touch Panel", *Veritas et Visus*, Oct. 2007, vol. 2, No. 6.
"Touch Panel", *Veritas et Visus*, Jan. 2008, vol. 2, Nos. 7-8.
"Touch Panel", *Veritas et Visus*, Mar. 2008, vol. 2, Nos. 9-10.
"Touch Panel", *Veritas et Visus*, Aug. 2008, vol. 3, Nos. 1-2.
"Touch Panel", *Veritas et Visus*, Nov. 2008, vol. 3, Nos. 3-4.
"Touch Panel", *Veritas et Visus*, Jan. 2009, vol. 3, Nos. 5-6.
"Touch Panel", *Veritas et Visus*, Mar. 2009, vol. 3, Nos. 7-8.
"Touch Panel", *Veritas et Visus*, May 2009, vol. 3, No. 9.
"Touch Panel", *Veritas et Visus*, Sep. 2009, vol. 4, Nos. 2-3.

"Touch Panel", *Veritas et Visus*, Sep. 2010, vol. 5, Nos. 2-3.

"Touch Panel", *Veritas et Visus*, Nov. 2010, vol. 5, No. 4.

Photobit Corporation, "VGA-format CMOS Camera-on-a-Chip for Multimedia Applications", 1999, 2 pages.

Villamor, et al., "Touch Gesture Reference Guide", Last updated Apr. 15, 2010, 7 pages.

Wang, et al., "Stereo camera calibration without absolute world coordinate information", *SPIE*, Jun. 14, 1995, 2620: 655-662.

Wrobel, et al., "Minimum Solutions for Orientation", *Calibration and Orientation of Cameras in Computer Vision, Springer Series in Information Sciences*, 2001, 34: 28-33.

* cited by examiner

TOUCH SCREEN SIGNAL PROCESSING WITH SINGLE-POINT CALIBRATION

PRIORITY CLAIM

This application claims priority as a continuation-in-part of U.S. patent application Ser. No. 12/578,165, filed Oct. 13, 2009, which is a continuation of U.S. patent application Ser. No. 11/033,183, filed Jan. 11, 2005 (and now U.S. Pat. No. 7,629,967), which is a continuation of Application No. PCT NZ2004/000029, published as WO 2004/072843, filed Feb. 16, 2004, which claims priority to NZ Application No. 524211, filed Feb. 14, 2003, each of which is incorporated by reference herein in its entirety.

TECHNICAL FIELD

The present invention relates to a touch sensitive screen and in particular to optically detecting the presence of an object by using signal processing.

BACKGROUND

Touch screens can take on forms including, but not limited to, resistive, capacitive, surface acoustic wave (SAW), infrared (IR), and optical. Each of these types of touch screen has its own features, advantages and disadvantages.

Resistive is a common type of touch screen technology. It is a low-cost solution found in many touch screen applications, including hand-held computers, PDA's, consumer electronics, and point-of-sale-applications. A resistive touch screen uses a controller and a specifically coated glass overlay on the display face to produce the touch connection. The primary types of resistive overlays are 4-wire, 5-wire, and 8 wires. The 5-wire and 8-wire technologies are more expensive to manufacture and calibrate, while 4-wire provides lower image clarity. Two options are generally given: polished or anti-glare. Polished offers clarity of image, but generally introduces glare. Anti-glare will minimize glare, but will also further diffuse the light thereby reducing the clarity. One benefit of using a resistive display is that it can be accessed with a finger (gloved or not), pen, stylus, or a hard object. However, resistive displays are less effective in public environments due to the degradation in image clarity caused by the layers of resistive film, and its susceptibility to scratching. Despite the trade-offs, the resistive screen is the most popular technology because of its relatively low price (at smaller screen sizes), and ability to use a range of input means (fingers, gloves, hard and soft stylus).

Capacitive touch screens can comprise glass and may be designed for use in ATM's and similar kiosk type applications. A small current of electricity runs across the screen with circuits located at the corners of the screen to measure the capacitance of a person touching the overlay. Touching the screen interrupts the current and activates the software operating the kiosk. Because the glass and bezel that mounts it to the monitor can be sealed, the touch screen is both durable and resistant to water, dirt and dust. This makes it commonly used in harsher environments like gaming, vending retail displays, public kiosks and industrial applications. However, the capacitive touch screen is only activated by the touch of a human finger and a gloved finger, pen, stylus or hard object will not work. Hence, it is inappropriate for use in many applications, including medical and food preparation.

Surface acoustic wave (SAW) technology provides better image clarity because it uses pure glass construction. A SAW touch screen uses a glass display overlay. Sound waves are transmitted across the surface of the display. Each wave is spread across the screen by bouncing off reflector arrays along the edges of the overlay. Two receivers detect the waves. When the user touches the glass surface, the user's finger absorbs some of the energy of the acoustic wave and the controller circuitry measures the touch location. SAW touch screen technology is used in ATM's, Amusements Parks, Banking and Financial Applications and kiosks. The technology is not able to be gasket sealed, and hence is not suitable to many industrial or commercial applications. Compared to resistive and capacitive technologies, it provides superior image clarity, resolution, and higher light transmission.

Infrared technology relies on the interruption of an infrared light grid in front of the display screen. The touch frame or opto-matrix frame contains a row of infrared LEDs and photo transistors; each mounted on two opposite sides to create a grid of invisible infrared light. The frame assembly is comprised of printed wiring boards on which the opto-electronics are mounted and is concealed behind an infrared-transparent bezel. The bezel shields the opto-electronics from the operating environment while allowing the infrared beams to pass through. The infrared controller sequentially pulses the LEDs to create a grid of infrared light beams. When a stylus, such as a finger, enters the grid, it obstructs the beams. One or more phototransistors detect the absence of light and transmit a signal that identifies the x and y coordinates. Infrared touch screens are often used in manufacturing and medical applications because they can be completely sealed and operated using any number of hard or soft objects. An issue with infrared can relate to the "seating" of the touch frame, which may be slightly above the screen. Consequently, it is susceptible to "early activation" before the finger or stylus has actually touched the screen. The cost to manufacture the infrared bezel can be quite high.

Optical imaging for touch screens uses a combination of line-scan cameras, digital signal processing, front or back illumination and algorithms to determine a point of touch. The imaging lenses image the user's finger, stylus or object by scanning along the surface of the display. This type of touch screen is susceptible to false readings due to moving shadows and bright lights and also requires that the screen be touched before a reading is taken. Attempts have been made to overcome these disadvantages. Touch screens using optical imaging technology are disclosed in the following publications.

Examples of touch screen technology can be found in U.S. Pat. Nos. 4,943,806; 5,914,709; 5,317,140; 5,698,845; 4,782, 328; and U.S. Pat. No. 4,868,551.

SUMMARY

Objects and advantages of the present subject matter will be apparent to one of ordinary skill in the art upon careful review of the present disclosure and/or practice of one or more embodiments of the claimed subject matter.

A coordinate detection system can comprise a display screen, a touch surface corresponding the top of the display screen or a material positioned above the screen and defining a touch area, at least one camera outside the touch area and configured to capture an image of space above the touch surface, and a processor executing program code to identify whether an object interferes with the light from the light source projected through the touch surface based on the image captured by the at least one camera. The processor can be configured to carry out a calibration routine utilizing a single touch point in order to determine a plane corresponding to the touch surface by using mirror images of the features adjacent the touch surface, images of the features, and/or based on the touch point and a normal to the reflective plane defined by an image of the object and its mirror image. The touch point need not actually correspond to an actual touch, but may be inferred based on the object and its mirror image. Additionally, in some embodiments, the touch surface may comprise a surface outside and separate from the display.

In some aspects, the invention may broadly be said to consist in a touch display comprising: a screen for a user to touch and view an image on or through; light sources at one or more edges of said screen, said light sources directing light across the surface of said screen; at least two cameras having outputs, each said camera located at the periphery of said screen to image the space in front of said screen, said output including a scanned image; means for processing said outputs to detect the level of light, said light including: direct light from said light sources, and/or reflected light from said light sources; a processor receiving the processed outputs of said cameras, said processor employing triangulation techniques and said processed outputs to determine whether the processed outputs indicate the presence of an object proximate to said screen and if so the location of said object.

Preferably said processed output indicates the relative bearing of a presumed object location relative to said camera. Preferably said processed output indicates the relative bearing of a presumed object location relative to the centre of the lens of said camera. Preferably said processor determines location of said object as a planar screen co-ordinate.

Preferably said light sources are behind said screen arranged to project light through said screen and said display includes at each edge having a light source, light deflectors in front of said screen, directing light emitted from said light sources across the surface of said screen.

Preferably said cameras are line scan cameras, said camera output including information on line scanned and said processor using said information in determining location of said object.

Preferably said touch display can include means for modulating said light from said light sources to provide a frequency band within the imageable range of said cameras and means for excluding image data outside said frequency band.

Preferably said means for processing said outputs includes said means for excluding image data outside said frequency band and said means for excluding image data outside said frequency includes filtering. Preferably, filtering includes applying a filter selected from the group consisting of: a comb filter; a high pass filter; a notch filter; and a band pass filter.

Preferably said touch display can include means for controlling said light sources and means for taking and processing an image taken in a non lighted ambient light state and in a lighted state, wherein said means for processing said outputs subtracts the ambient state from the lighted state before detecting the level of light.

Preferably said light sources are LEDs and said touch display includes means for controlling the operation of sections of said light source independent of other sections of said light source. Preferably means for controlling the operation of sections of said light source includes means for independently controlling the effective intensity of said light source.

Preferably said means for controlling sections of said light source comprises wiring said sections in antiphase and driving using a bridge drive. Preferably means for controlling sections of said light source comprises using a diagonal bridge drive. Preferably said means for controlling sections of said light source comprises using a shift register for each section to be controlled.

Preferably said means for taking and processing images includes controlling sections of said light sources and each said camera and said means for processing said outputs includes processing information on whether a said section is lighted or not. Preferably some section are lighted and others are not when an image is taken.

Accordingly in another aspect the invention may broadly be said to consist in a touch display comprising: a screen for a user to touch and view an image on or through; light sources at one or more edges edge of said screen, said light sources directing light across the surface of said screen; at least two cameras having outputs located at the periphery of said screen, said cameras located so as not to receive direct light from said light sources, each said camera imaging the space in front of said screen, said output including a scanned image; means for processing said outputs to detect level of reflected light; and a processor receiving the processed outputs of said cameras, said processor employing triangulation techniques and said processed outputs to determine whether the processed outputs indicate the presence of an object proximate to said screen and if so the location of said object.

Preferably said processed output indicates the relative bearing of a presumed object location relative to said camera. Preferably said processed output indicates the relative bearing of a presumed object location relative to the centre of the lens of said camera. Preferably said processor determines location of said object as a planar screen co-ordinate.

Preferably said touch display can include means for modulating said light from said light sources to provide a frequency band within the imageable range of said cameras; and means for excluding image data outside said frequency band. Preferably said means for processing said outputs includes said means for excluding image data outside said frequency band and said means for excluding image data outside said frequency includes filtering. Preferably filtering includes applying a filter selected from the group consisting of a comb filter; a high pass filter; a notch filter; and a band pass filter.

Preferably said touch display includes means for controlling said light sources and means for taking and processing an image taken in a non lighted ambient light state and in a lighted state, wherein said means for processing said outputs subtracts the ambient state from the lighted state before detecting the level of light. Preferably said light sources are LEDs and said touch display includes means for controlling the operation of sections of said light source independent of other sections of said light source.

Preferably means for controlling the operation of sections of said light source includes means for independently controlling the effective intensity of said light source. Preferably the means for controlling sections of said light source comprises wiring said sections in antiphase and driving using a bridge drive. Preferably the means for controlling sections of said light source comprises using a diagonal bridge drive. Preferably the means for controlling sections of said light source comprises using a shift register for each section to be controlled.

Preferably said means for taking and processing images includes controlling sections of said light sources and each said camera and said means for processing said outputs includes processing information on whether a said section is lighted or not. Preferably some sections are lighted and others are not when an image is taken.

Preferably said screen is reflective, said camera further images said screen, and said means for processing outputs detects the level of light from the mirror image. Preferably said processed out put indicates the relative bearing of a presumed object relative to said camera and the distance of said object from said screen.

Accordingly in another aspect the invention may broadly be said to consist in a method of receiving user inputs in reference to an image including the steps of providing a screen for a user to touch and view an image on or through; providing light sources at one or more edges of said screen, said light sources directing light across the surface of said screen; providing at least two cameras having outputs, each said camera located at the periphery of said screen to image the space in front of said screen, said output including a scanned image; processing said outputs to detect the level of light, said light including: direct light from said light sources, and/or reflected light from said light sources; processing the processed outputs of said cameras, and using triangulation techniques to obtain the location of said object.

Preferably said processed output indicates the relative bearing of a presumed object location relative to a said camera.

Preferably said processed output indicates the relative bearing of a presumed object location relative to the centre of the lens of said camera. Preferably said location of is a planar screen co-ordinate. Preferably said light sources are behind said screen and arranged to project light through said screen and said display includes at each edge having a light source, light deflectors in front of said screen, directing light emitted from said light sources across the surface of said screen.

Preferably said cameras are line scan cameras, said camera output including information on line scanned and said processor using said information in determining location of said object.

Preferably said method includes the steps of: modulating said light from said light sources to provide a frequency band within the imageable range of said cameras and excluding image data outside said frequency band. Preferably the step of processing said outputs includes the steps of excluding image data outside said frequency band and said step of excluding image data outside said frequency includes filtering. Preferably filtering includes the step of applying a filter selected from the group consisting of: a comb filter; a high pass filter; a notch filter; and a band pass filter.

Preferably said method includes the steps of: controlling said light sources and taking and processing an image taken in a non lighted ambient light state and in a lighted state, wherein said step of processing said outputs subtracts the ambient state from the lighted state before detecting the level of light. Preferably said light sources are LEDs and said touch display includes means for controlling the operation of sections of said light source independent of other sections of said light source. Preferably the step of controlling the operation of sections of said light source includes independently controlling the effective intensity of said light source.

Preferably the step of controlling sections of said light source comprises wiring said sections in antiphase and driving using a bridge drive. Preferably the step of controlling sections of said light source comprises using a diagonal bridge drive. Preferably the step of controlling sections of said light source comprises using a shift register for each section to be controlled.

Preferably the step of taking and processing images includes controlling sections of said light sources and each said camera and said step of processing said outputs includes processing information on whether a said section is lighted or not. Preferably some sections are lighted and others are not when an image is taken.

Accordingly in a further aspect the invention may broadly be said to consist in a method of receiving user inputs in reference to an image including the steps of: providing a screen for a user to touch and view an image on or through; providing light sources at one or more edges edge of said screen, said light sources directing light across the surface of said screen; providing at least two cameras having outputs located at the periphery of said screen, said cameras located so as not to receive direct light from said light sources, each said camera imaging the space in front of said screen, said output including a scanned image; processing said outputs to detect level of reflected light; and processing the processed outputs of said cameras, employing triangulation techniques and said processed outputs to determine whether the processed outputs indicate the presence of an object proximate to said screen and if so the location of said object.

Preferably said processed output indicates the relative bearing of a presumed object location relative to said camera. Preferably said processed output indicates the relative bearing of a presumed object location relative to the centre of the lens of said camera. Preferably said processor determines location of said object as a planar screen co-ordinate.

Preferably said method includes: modulating said light from said light sources to provide a frequency band within the imageable range of said cameras and excluding image data outside said frequency band. The method can use means for processing said outputs includes said means for excluding image data outside said frequency band and said means for excluding image data outside said frequency includes filtering. Preferably filtering includes applying a filter selected from the group consisting of: a comb filter; a high pass filter; a notch filter; and a band pass filter.

Preferably said method includes controlling said light sources and taking and processing an image taken in a non lighted ambient light state and in a lighted state, wherein said means for processing said outputs subtracts the ambient state from the lighted state before detecting the level of light.

Preferably said light sources are LEDs and said touch display includes means for controlling the operation of sections of said light source independent of other sections of said light source. Preferably the means for controlling the operation of sections of said light source includes means for independently controlling the effective intensity of said light source. Preferably the means for controlling sections of said light source comprises wiring said sections in antiphase and driving using a bridge drive.

Preferably controlling sections of said light source comprises using a diagonal bridge drive. Preferably controlling sections of said light source comprises using a shift register for each section to be controlled.

Preferably taking and processing images includes controlling sections of said light sources and each said camera and said means for processing said outputs includes processing information on whether a said section is lighted or not. Preferably some sections are lighted and others are not when an image is taken.

Preferably said screen is reflective, said camera further images said screen, and said means for processing outputs detects the level of light from the mirror image. Preferably said processed out put indicates the relative bearing of a presumed object relative to said camera and the distance of said object from said screen.

Accordingly in yet another aspect the invention may broadly be said to consist in a method of receiving user inputs in reference to an image, the method comprising providing at least one light source on or adjacent the periphery of said image, said light source(s) directing light across said image; detecting at least two locations on or adjacent the periphery of said image, the level of light and providing said level as an output; and processing said outputs using triangulation techniques to determine whether said outputs indicate the presence of an object proximate to said image and if so the location of said object.

Preferably said locations are substantially non-opposite so that when an object is present said output is substantially indicative of light reflected from said object.

Accordingly in a still further aspect the invention may broadly be said to consist in a user input device for locating an object with reference to an image comprising: at least one light source at or proximate to the periphery of said image, said light source directing light across said image; at one detector having an output, said detector located or in proximity to said image to image the space in front of said screen, said output indicative of a level of light; and a processor receiving said outputs and using triangulation techniques and said outputs determining the presence of said object and if so the location of said object.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the following appended figures, in which use of like reference numerals in different features is intended to illustrate like or analogous components.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made without departing from the scope or spirit of the disclosure and claims. For instance, features illustrated or described as part of one embodiment may be used on another embodiment to yield still further embodiments. Thus, it is intended that the present disclosure includes any modifications and variations as come within the scope of the appended claims and their equivalents.

The present invention relates to improvements in signal processing in the field of optical imaging touch screens. In the preferred embodiment the optical touch screen uses front illumination and is comprised of a screen, a series of light sources, and at least two area scan cameras located in the same plane and at the periphery of the screen. In another embodiment, the optical touch screen uses backlight illumination; the screen is surrounded by an array of light sources located behind the touch panel which are redirected across the surface of the touch panel. At least two line scan cameras are used in the same plane as the touch screen panel. The signal processing improvements created by these implementations are that an object can be sensed when in close proximity to the surface of the touch screen, calibration is simple, and the sensing of an object is not effected by the changing ambient light conditions, for example moving lights or shadows.

In additional embodiments, a coordinate detection system is configured to direct light through a touch surface, with the touch surface corresponding to the screen or a material above the screen.

Figure 3:
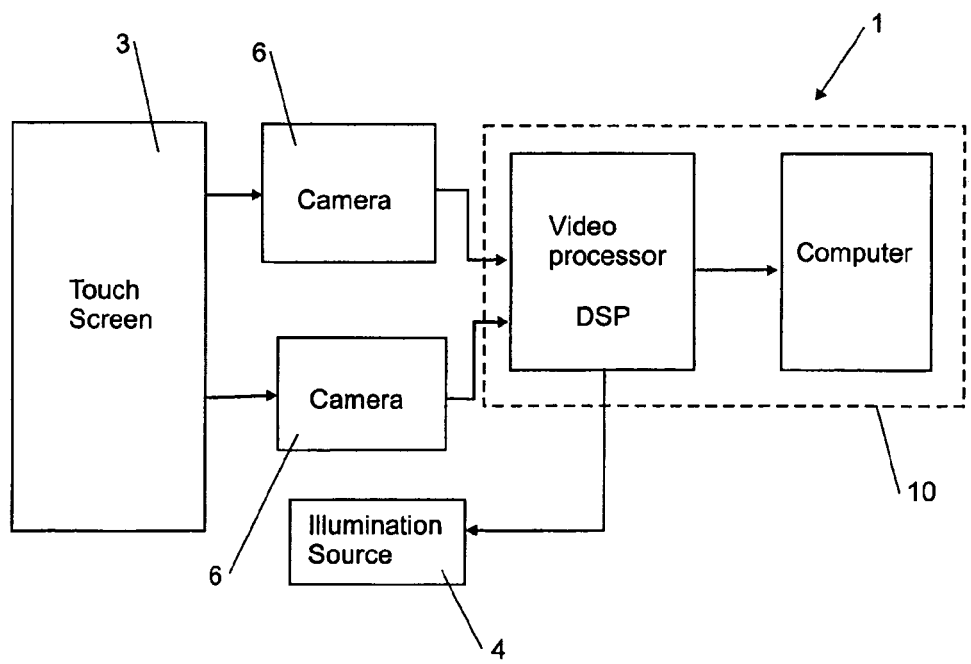
FIG. 3 is a block diagram of the system of the preferred embodiment of the touch screen of the present invention.

A block diagram of a general touch screen system 1 is shown in FIG. 3. Information flows from the cameras 6 to the video processing unit and computer, together referred to as the processing module 10. The processing module 10 performs many types of calculations including filtering, data sampling, and triangulation and controls the modulation of the illumination source 4.

Front Illumination Touch Screen

Figure 1:
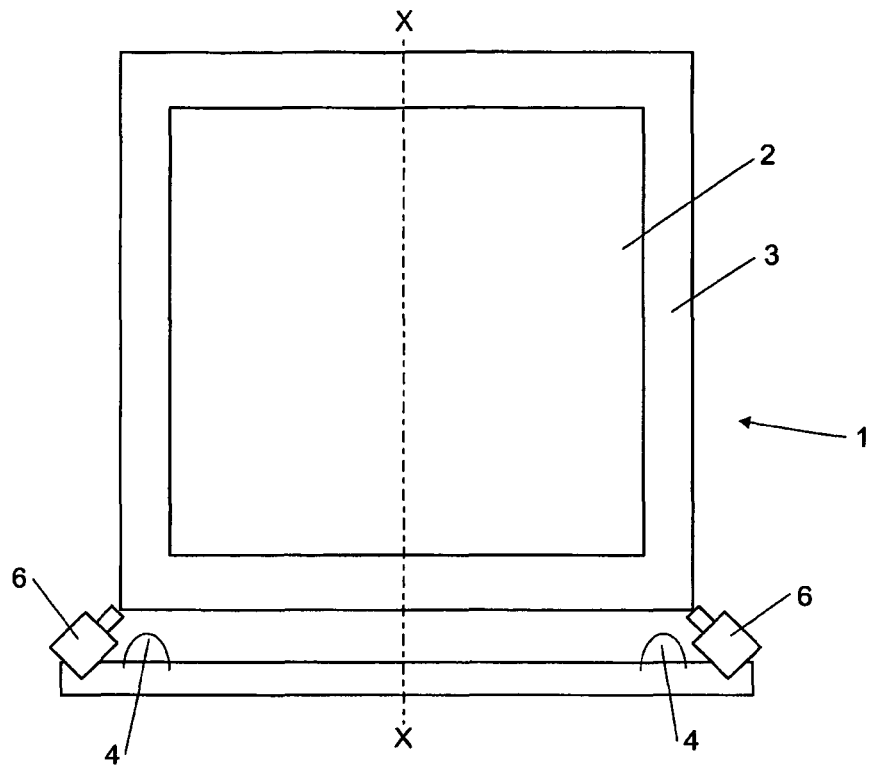
FIG. 1 is a diagrammatic illustration of a front view of the preferred embodiment of the touch screen of the present invention.

One preferred embodiment of the touch screen of the present invention is shown in FIG. 1. The touch screen system 1 is comprised of a monitor 2, a touch screen panel 3, at least two lights 4, a processing module (not shown) and at least two area scan cameras 6. The monitor 2, which displays information to the user, is positioned behind the touch screen panel 3. Below the touch screen panel 3 and the monitor 2 are the area scan cameras 6 and light sources 4. The light sources 4 are preferably Light Emitting Diodes (LED) but may be another type of light source, for example, a fluorescent tube. LEDs are ideally used as they may be modulated as required, they do not have an inherent switching frequency. The cameras 6 and LEDs 4 are in the same plane as the touch panel 3.

Figure 1A:
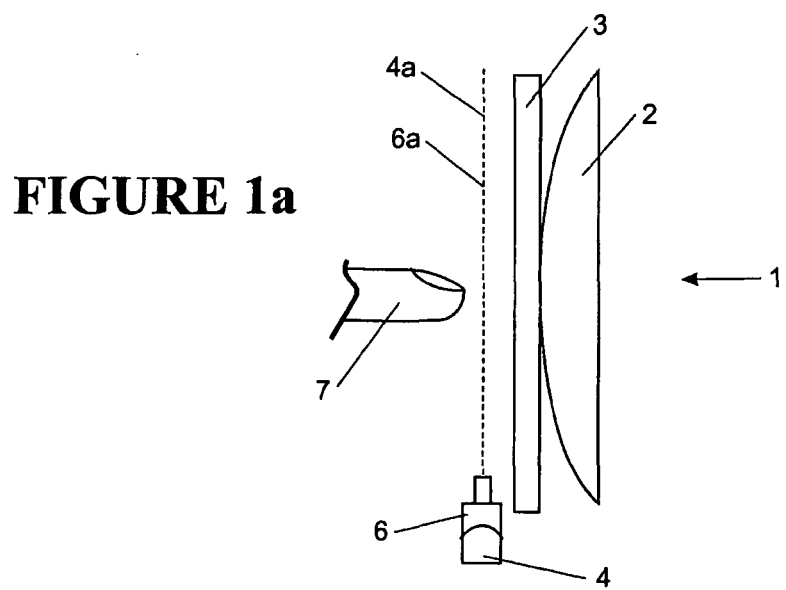
FIG. 1a is an illustration of a cross sectional view through X-X of FIG. 1.
Figure 1B:
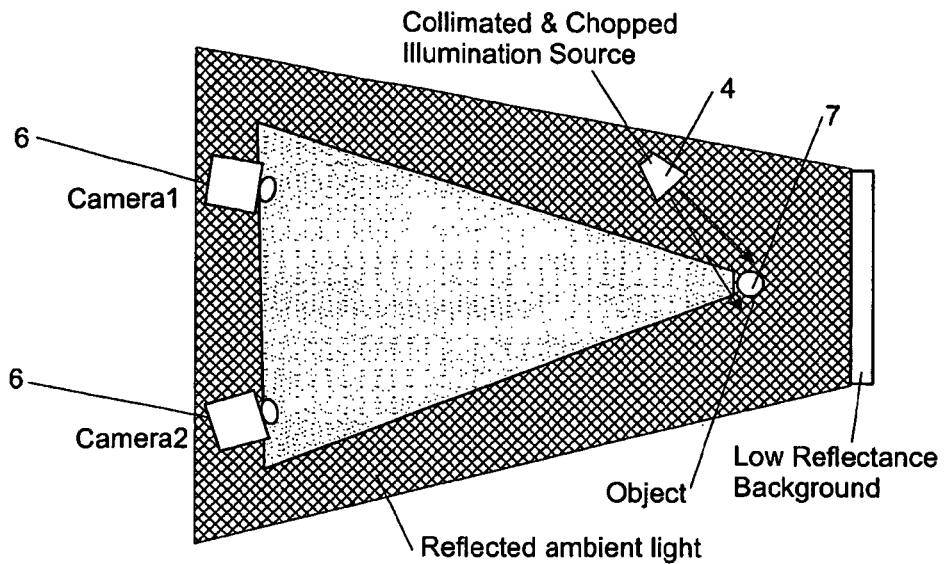
FIG. 1b is an illustration of front illumination of the preferred embodiment of the touch screen of the present invention.

Referring to FIG. 1*a*, the viewing field 6*a* of the area scan camera 6 and the radiation path 4*a* of the LEDs 4 are in the same plane and parallel to the touch panel 3. When an object 7, shown as a finger, enters into the radiation path 4*a*, it is illuminated. This is typically known as front panel illumination or object illumination. In FIG. 1*b*, this principle is again illustrated. Once a finger 7 enters into the radiation field 4*a*, a signal is reflected back to the camera 6. This indicates that a finger 7 is near to or touching the touch panel 3. In order to determine if the finger 7 is actually touching the touch panel 3, the location of the touch panel 3 must be established. This is performed using another signal, a mirrored signal.

Mirrored Signal

The mirrored signal occurs when the object 7 nears the touch panel 3. The touch panel 3 is preferably made from glass which has reflective properties. As shown in FIG. 2, the finger 7 is positioned at a distance 8 above the touch panel 3 and is mirrored 7*a* in the touch panel 3. The camera 6 (only shown as the camera lens) images both the finger 7 and the reflected image 7*a*. The image of finger 7 is reflected 7*a* in panel 3; this can be seen through the field lines 6*b*, 6*c* and virtual field line 6*d*. This allows the camera 6 to image the reflected 7*a* image of the finger 7. The data produced from the camera 6 corresponds to the position of the field lines 6*e*, 6*b* as they enter the camera 6. This data is then fed into a processing module 10 for analysis.

Figure 2A:
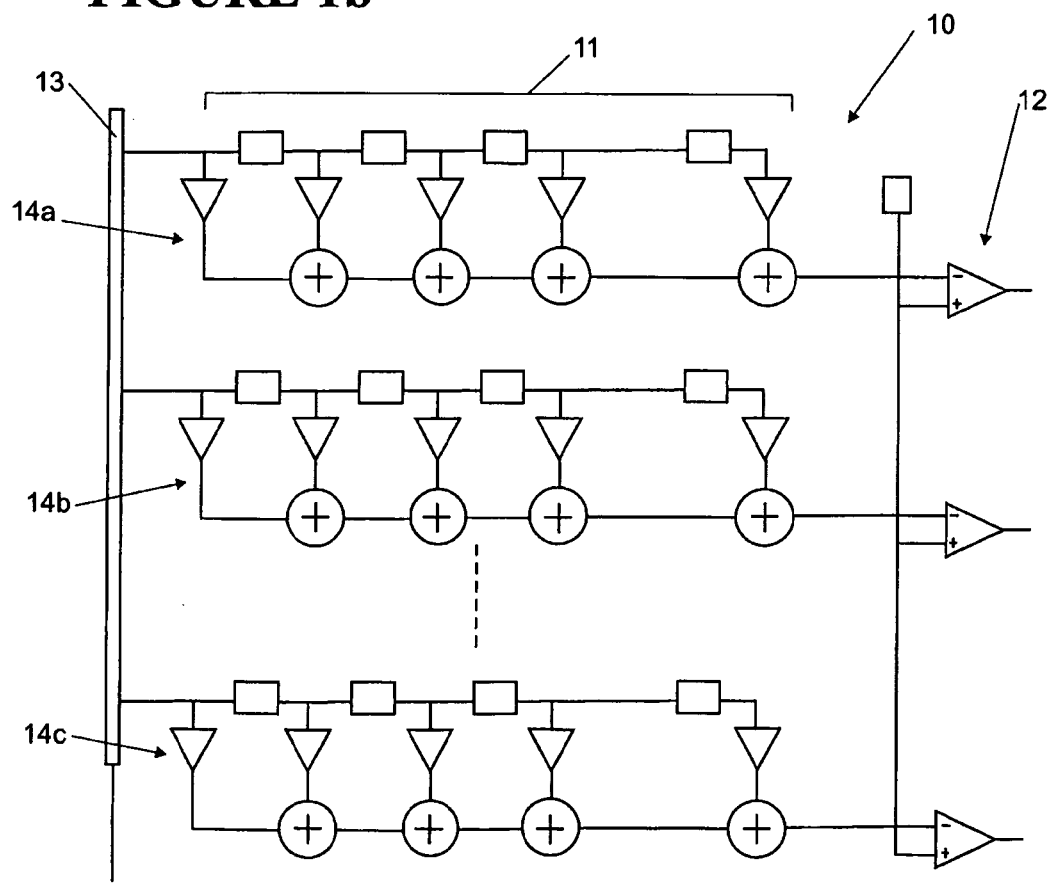
FIG. 2a is a block diagram of the filter implementation of the preferred embodiment of the touch screen of the present invention.
Figure 2:
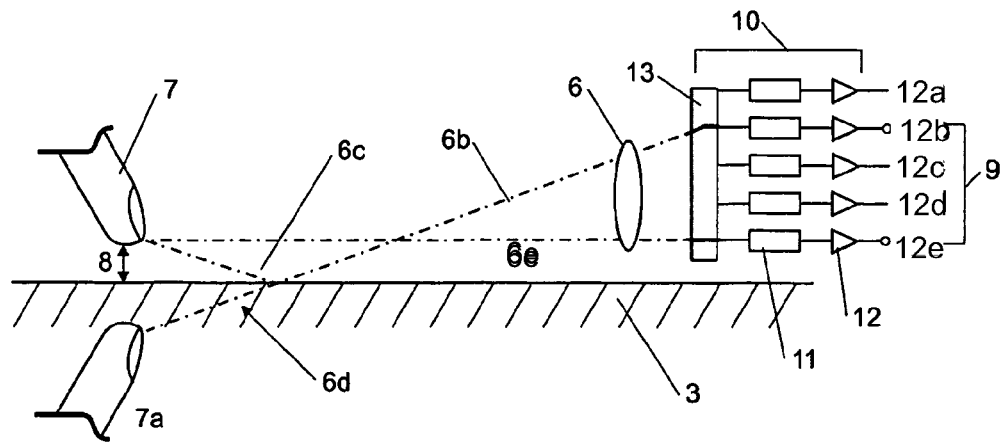
FIG. 2 is an illustration of the mirroring effect in the preferred embodiment of the touch screen of the present invention.
Figure 2B:
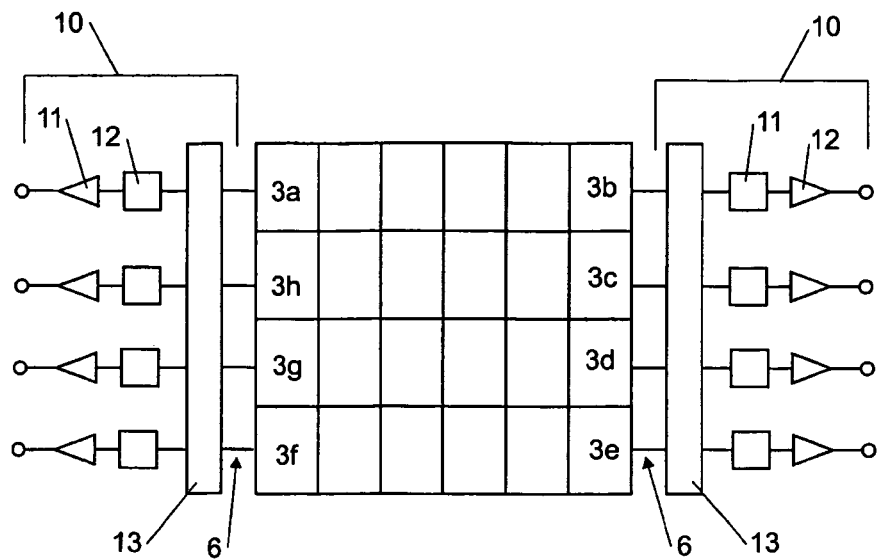
FIG. 2b is a diagrammatic illustration of the pixels seen by an area camera and transmitted to the processing module in the preferred embodiment of the present invention.

A section of the processing module 10 is shown in FIG. 2*a*. Within the processing module 10 is a series of scanning imagers 13 and digital filters 11 and comparators 12 implemented in software. There are a set number of pixels on the touch panel, for example 30,000 pixels. These may be divided up into 100 columns of 300 pixels. The number of pixels may be more or less than the numbers used, the numbers are used for example only. In this situation, there are 30,000 digital filters 11 and comparators 12, broken up into 100 columns of 300 pixels, this forms a matrix similar to the matrix of pixels on the monitor 2. A representation of this is shown in FIG. 2*a* as one column is serviced by one image scanner 13 and three sets 14*a*, 14*b*, 14*c* of digital filters 11 and comparators 12, this allows information from three pixels to be read. A more illustrated example of this matrix is shown in FIG. 2*b*. Eight pixels 3*a*-3*h* are connected, in groups of columns, to an image scanner 13 that is subsequently connected to a filter 11 and a comparator 12 (as part of the processing module 10). The numbers used in FIG. 2*b* are used for illustration only; an accurate number of pixels could be greater or less in number.

The pixels shown in this diagram may not form this shape in the panel 3, their shape will be dictated by the position and type of camera 6 used.

Referring back to FIG. 2, finger 7 and mirrored finger 7*a* activates at least two pixels; two pixels are used for simplicity. This is shown by the field lines 6*e* and 6*b* entering the processing module 10. This activates the software so the two signals pass through a digital filter 11 and a comparator 12 and results in a digital signal output 12*a*-12*e*. The comparator 12 compares the output from the filter 11 to a predetermined threshold value. If there is a finger 7 detected at the pixel in question, the output will be high, otherwise it will be low.

The mirrored signal also provides information about the position of the finger 7 in relation to the cameras 6. It can determine the height 8 of the finger 7 above the panel 3 and its angular position. The information gathered from the mirrored signal is enough to determine where the finger 7 is in relation to the panel 3 without the finger 7 having to touch the panel 3.

Figure 4:
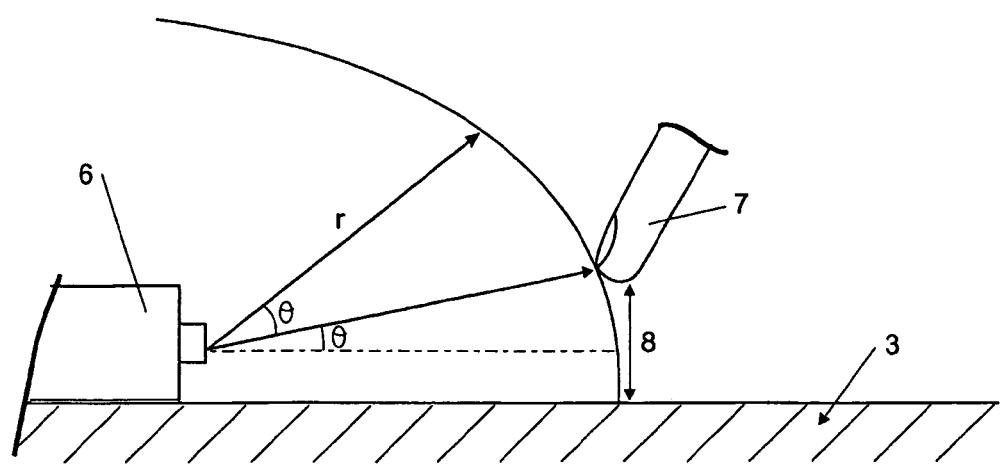
FIG. 4 is a side view of the determination of the position of an object using the mirrored signal in the preferred embodiment of the touch screen of the present invention.
Figure 4A:
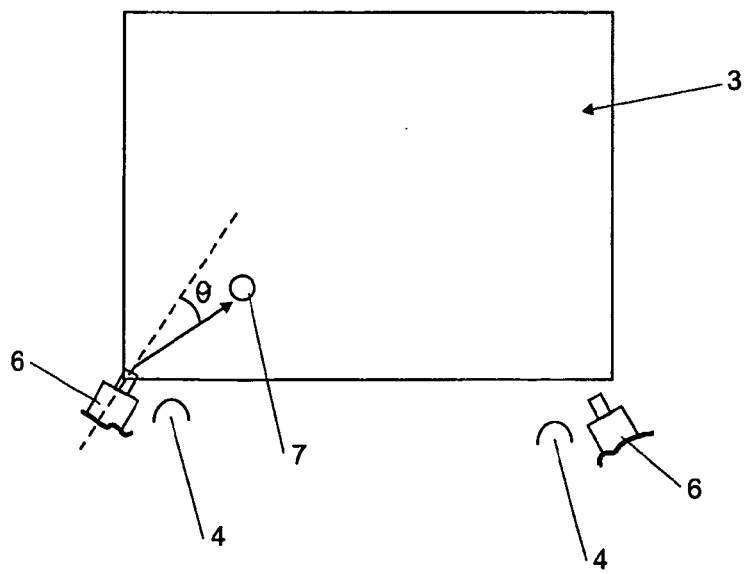
FIG. 4a is top view of the determination of the position of an object using the mirrored signal in the preferred embodiment of the touch screen of the present invention.

FIGS. 4 and 4*a* show the positional information that is able to be obtained from the processing of the mirrored signal. The positional information is given in polar co-ordinates. The positional information relates to the height of the finger 7, and the position of the finger 7 over the panel 3.

Referring again to FIG. 2, the height that the finger 7 is above the panel 3 can be seen in the distance between the outputs 12*a*-12*e*. In this example the finger 7 is a height 8 above the panel 3 and the outputs 12*b* and 12*e* are producing a high signal. The other outputs 12*a*, 12*d* are producing a low signal. It has been found that the distance 9 between the high outputs 12*b*, 12*e* is twice as great as the actual height 8 of the finger above the panel 3.

Modulating

The processing module 10 modulates and collimates the LEDs 4 and sets a sampling rate. The LEDs 4 are modulated, in the simplest embodiment the LEDs 4 are switched on and off at a predetermined frequency. Other types of modulation are possible, for example modulation with a sine wave. Modulating the LEDs 4 at a high frequency results in a frequency reading (when the finger 7 is sensed) that is significantly greater than any other frequencies produced by changing lights and shadows. The modulation frequency is greater than 500 Hz but no more than 10 kHz.

Sampling

The cameras 6 continuously generate an output, which due to data and time constraints is periodically sampled by the processing module 10. In the preferred embodiment, the sampling rate is at least two times the modulation frequency; this is used to avoid aliasing. The modulation of the LEDs and the sampling frequency does not need to be synchronised.

Filtering

Figure 6:
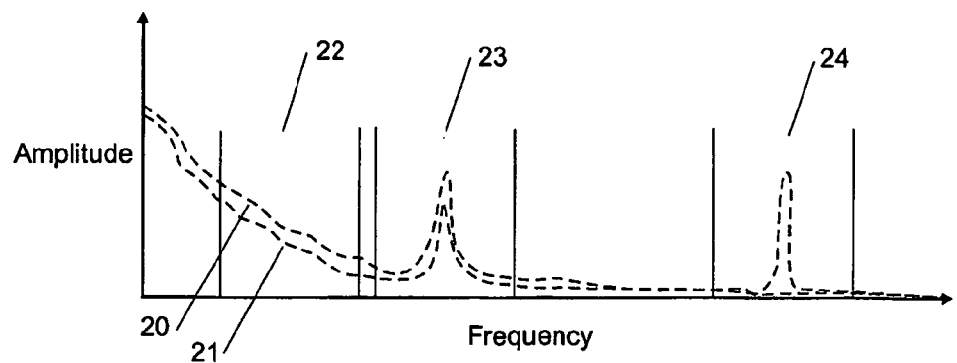
FIG. 6 is a graph representing in the frequency domain the output from the imager in the processing module in the preferred embodiment of the touch screen of the present invention.

The output in the frequency domain from the scanning imager 13 is shown in FIG. 6. In FIG. 6, there are two typical graphs, one showing when there is no object being sensed 21 and one showing when a finger is sensed 20. In both graphs there is a region of movement of shadows 22 at approximately 5 to 20 Hz, and an AC mains frequency region 23 at approximately 50 to 60 Hz.

In a preferred embodiment when there is not object in the field of view, no signal is transmitted to the area camera so there are no other peaks in the output. When an object is in the field of view, there is a signal 24 corresponding to the LED modulated frequency, for example 500 Hz. The lower unwanted frequencies 22, 23 can be removed by various forms of filters. Types of filters can include comb, high pass, notch, and band pass filters.

Figure 6A:
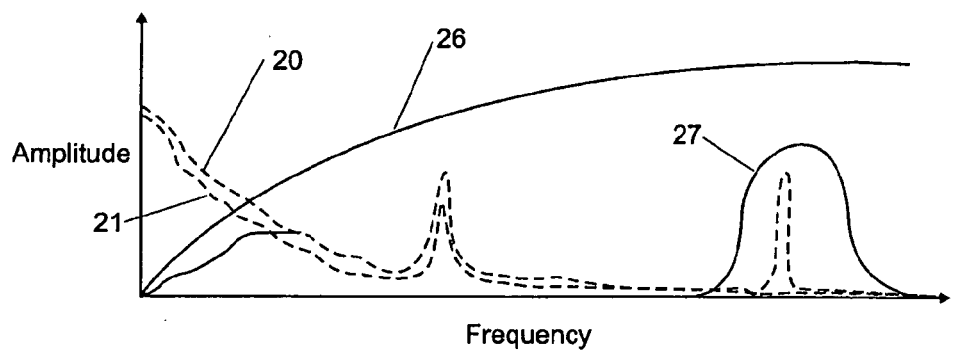
FIG. 6a is a graph representing in the frequency domain the filters responses on the signal from the imager in the preferred embodiment of the touch screen of the present invention.
Figure 6B:
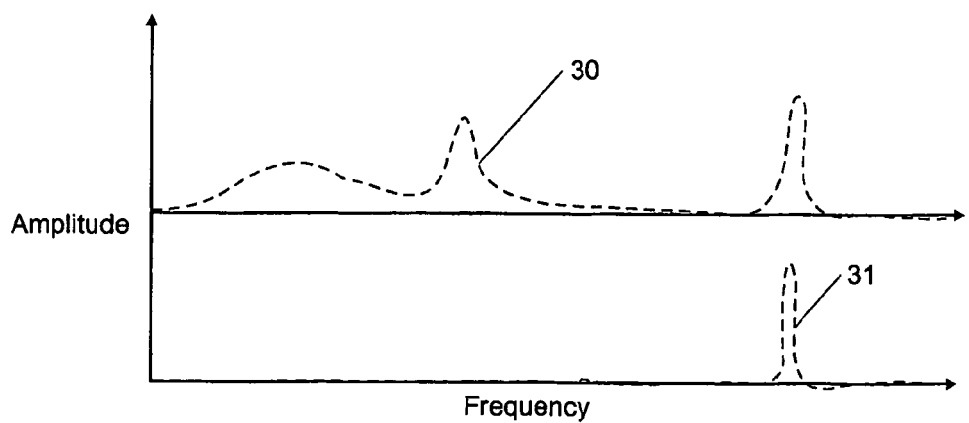
FIG. 6b is a graph representing in the frequency domain the separation of the object from the background after two types of filtering in the preferred embodiment of the touch screen of the present invention.

In FIG. 6*a* the output from the image scanner is shown with a couple of different filter responses 26, 27 being applied to the signal 20. In a simple implementation a 500 Hz comb filter 26 may be implemented (if using a 500 Hz modulation frequency). This will remove only the lowest frequencies. A more advanced implementation would involve using a band pass 27 or notch filter. In this situation, all the data, except the region where the desired frequency is expected, is removed. In FIG. 6a this is shown as a 500 Hz narrow band filter 27 applied to the signal 20 with a modulation frequency of 500 Hz. These outputs 30, 31 from the filters 26, 27 are further shown in FIG. 6b. The top graph shows the output 30 if a comb filter 26 is used while the bottom graph shows the output 31 when a band filter 27 is used. The band filter 27 removes all unwanted signals while leaving the area of interest.

Once the signal has been filtered and the signal in the area of interest identified, the resulting signal is passed to the comparators to be converted into a digital signal and triangulation is performed to determine the actual position of the object. Triangulation is known in the prior art and disclosed in U.S. Pat. No. 5,534,917 and U.S. Pat. No. 4,782,328, and are herein incorporated by reference.

Calibration

Figure 5:
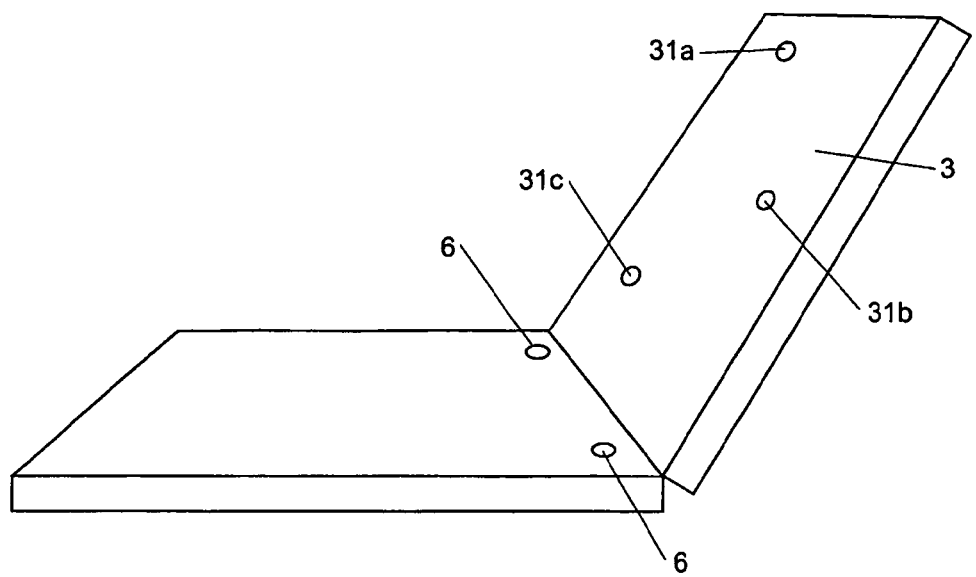
FIG. 5 is an illustration of the calibration in the preferred embodiment of the touch screen of the present invention.

One preferred embodiment of the touch screen of the present invention uses very quick and easy calibration that allows the touch screen to be used in any situation and moved to new locations, for example if the touch screen is manufactured as a lap top. Some embodiments of calibration involve touching the panel 3 in three different locations 31a, 31b, 31c, as shown in FIG. 5; this defines the touch plane of the touch panel 3. These three touch points 31a, 31b, 31c provide enough information to the processing module (not shown) to calculate the position and size of the touch plane in relation to the touch panel 3. Each touch point 31a, 31b, 31c uses both mirrored and direct signals, as previously described, to generate the required data. These touch points 31a, 31b, 31c may vary around the panel 3, they need not be the actual locations shown.

As noted in further detail below, other preferred embodiments may utilize fewer than three touches. For instance, some embodiments of calibration utilize only a single touch. Still further, some embodiments of calibration do not even require a true "touch"—that is, a single "touch point" may be inferred even in the absence of contact between an object and a touch surface (e.g., the screen).

Back Illumination Touch Screen

Figure 7D:
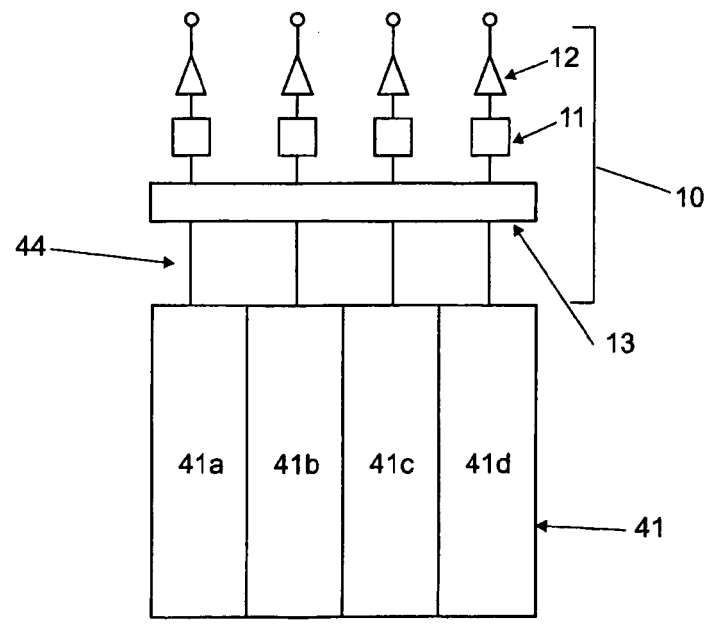
FIG. 7d is a diagrammatic illustration of the pixels seen by a line scan camera and transmitted to the processing module in the alternate embodiment of the present invention.
Figure 7:
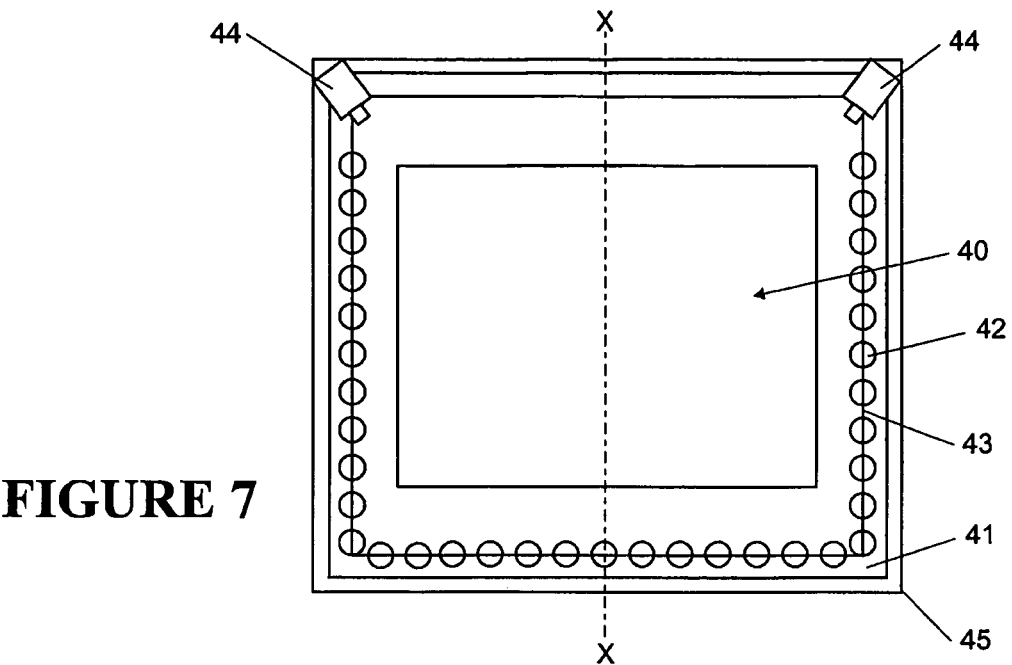
FIG. 7 is an illustration of a front view of the alternate embodiment of the touch screen of the present invention.

FIG. 7 shows an alternate embodiment of the touch screen of the present invention. As in the preferred embodiment, the monitor 40 is behind the touch panel 41 and around the sides and the lower edge of the panel 41 is an array of lights 42. These point outwards towards the user and are redirected across the panel 41 by a diffusing plate 43. The array of lights 42 consists of numerous Light Emitting Diodes (LEDs). The diffusing plates 43 are used redirect and diffuse the light emitted from the LEDs 42 across the panel 41. At least two line-scan cameras 44 are placed in the upper two corners of the panel 3 and are able to image an object. The cameras 44 can be alternately placed at any position around the periphery of the panel 41. Around the periphery of the touch panel 41 is a bezel 45 or enclosure. The bezel 45 acts as a frame that stops the light radiation from being transmitted to the external environment. The bezel 45 reflects the light rays into the cameras 44 so a light signal is always read into the camera 44 when there is no object near the touch panel 41.

Alternately, the array of lights 42 may be replaced with cold cathode tubes. When using a cold cathode tube, a diffusing plate 43 is not necessary as the outer tube of the cathode tube diffuses the light. The cold cathode tube runs along the entire length of one side of the panel 41. This provides a substantially even light intensity across the surface of the panel 41. Cold cathode tubes are not preferably used as they are difficult and expensive to modify to suit the specific length of each side of the panel 41. Using LED's allows greater flexibility in the size and shape of the panel 41.

Figure 7A:
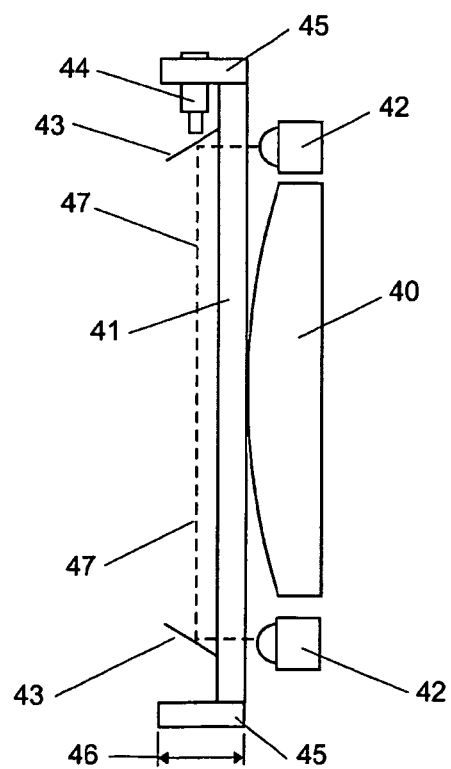
FIG. 7a is an illustration of a cross sectional view through X-X of the alternate embodiment of the touch screen of the present invention.

The diffusing plate 43 is used when the array of lights 42 consists of numerous LED's. The plate 43 is used to diffuse the light emitted from an LED and redirect it across the surface of panel 41. As shown in FIG. 7a, the light 47 from the LEDs 42 begins its path at right angles to the panel 41. Once it hits the diffusing plate 43, it is redirected parallel to the panel 41. The light 47 travels slightly above the surface of the panel 41 so to illuminate the panel 41. The light 47 is collimated and modulated by the processing module (not shown) as previously described.

Referring to FIG. 7a, the width 46 of the bezel 45 can be increased or decreased. Increasing the width 46 of the bezel 45 increases the distance at which an object can be sensed. Similarly, the opposite applies to decreasing the width 10 of the bezel 45. The line scan cameras 44 consists of a CCD element, lens and driver control circuitry. When an image is seen by the cameras 44 a corresponding output signal is generated.

Figure 7B:
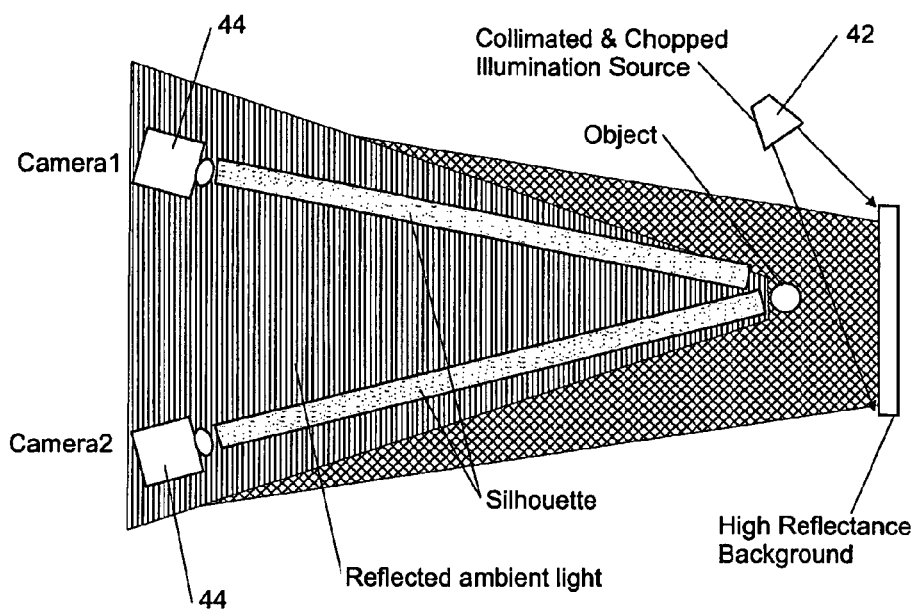
FIG. 7b is an illustration of rear illumination of the alternate embodiment of the touch screen of the present invention.
Figure 7C:
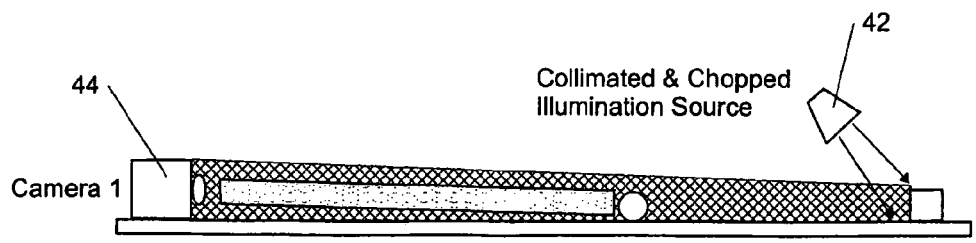
FIG. 7c is an illustration of rear illumination controlling the sense height of the alternate embodiment of the present invention.

Referring to FIGS. 7b and 7c, when the touch screen is not being used, i.e. when there is no user interaction or input, all the light emitted from the array of lights 42 is transmitted to the line-scan cameras 44. When there is user input, i.e. a user selects something on the screen by touching it with their finger; a section of the light being transmitted to the camera 44 is interrupted. Through calculations utilizing triangulation algorithms with the outputted data from the camera 44, the location of the activation can be determined.

The line scan cameras 44 can read two light variables, namely direct light transmitted from the LED's 42 and reflected light. The method of sensing and reading direct and mirrored light is similar to what has been previously described, but is simpler as line scan cameras can only read one column from the panel at once; it is not broken up into a matrix as when using an area scan camera. This is shown in FIG. 7d where the panel 41 is broken up into sections 41a-41d (what the line scan camera can see). The rest of the process has been described previously. The pixels shown in this diagram may not form this shape in the panel 41, their shape will be dictated by the position and type of camera 44 used.

In this alternative embodiment, since the bezel surrounds the touch panel, the line scan cameras will be continuously reading the modulated light transmitted from the LEDs. This will result in the modulated frequency being present in the output whenever there is no object to interrupt the light path. When an object interrupts the light path, the modulated frequency in the output will not be present. This indicates that an object is in near to or touching the touch panel. The frequency present in the output signal is twice the height (twice the amplitude) than the frequency in the preferred embodiment. This is due to both signals (direct and mirrored) being present at once.

Figure 8:
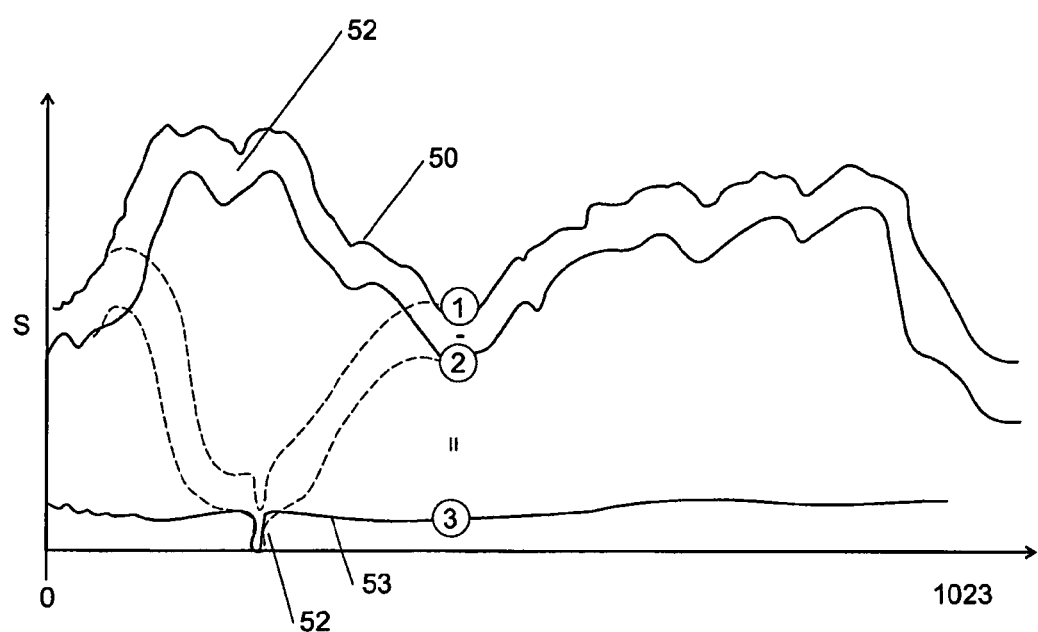
FIG. 8 is a graph representing simple separation of an object from the background in the alternate embodiment of the present invention.

In a further alternate embodiment, shown in FIG. 8, the output from the camera is sampled when the LEDs are modulating on and off. This provides a reading of ambient light plus backlight 50 and a reading of ambient light alone 51. When an object interrupts the light from the LEDs, there is a dip 52 in the output 50. As ambient light varies a lot, it is difficult to see this small dip 52. For this reason, the ambient reading 51 is subtracted from the ambient and backlight reading 50. This results in an output 54 where the dip 52 can be seen and thus simple thresholding can be used to identify the dip 52.

Calibration of this alternate embodiment can be performed in the same manner as previously described, although the touch points 31a, 31b, 31c (referring to FIG. 5) cannot be in the same line, they must be spread about the surface of the panel 3. Of course, other embodiments of calibration could be used with this alternative embodiment.

In FIG. 7 the backlight is broken up into a number of individual sections, 42a to 42f. One section or a subset of sections is activated at any time. Each of these sections is imaged by a subset of the pixels of the image sensors 44. Compared to a system with a single backlight control, the backlight emitters are operated at higher current for shorter periods. As the average power of the emitter is limited, the peak brightness is increased. Increased peak brightness improves the ambient light performance.

The backlight switching may advantageously be arranged such that while one section is illuminated, the ambient light level of another section is being measured by the signal processor. By simultaneously measuring ambient and backlit sections, speed is improved over single backlight systems.

The backlight brightness is adaptively adjusted by controlling LED current or pulse duration, as each section is activated so as to use the minimum average power whilst maintaining a constant signal to noise plus ambient ratio for the pixels that view that section.

Control of the plurality of sections with a minimum number of control lines is achieved in one of several ways.

Figure 9A:
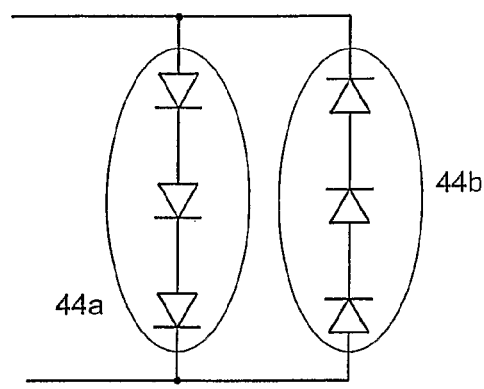
FIG. 9a shows a two section backlight driven by two wires of the present invention.

In a first implementation of a two section backlight the two groups of diodes 44a, 44b can be wired antiphase and driven with bridge drive as shown in FIG. 9a.

Figure 9B:
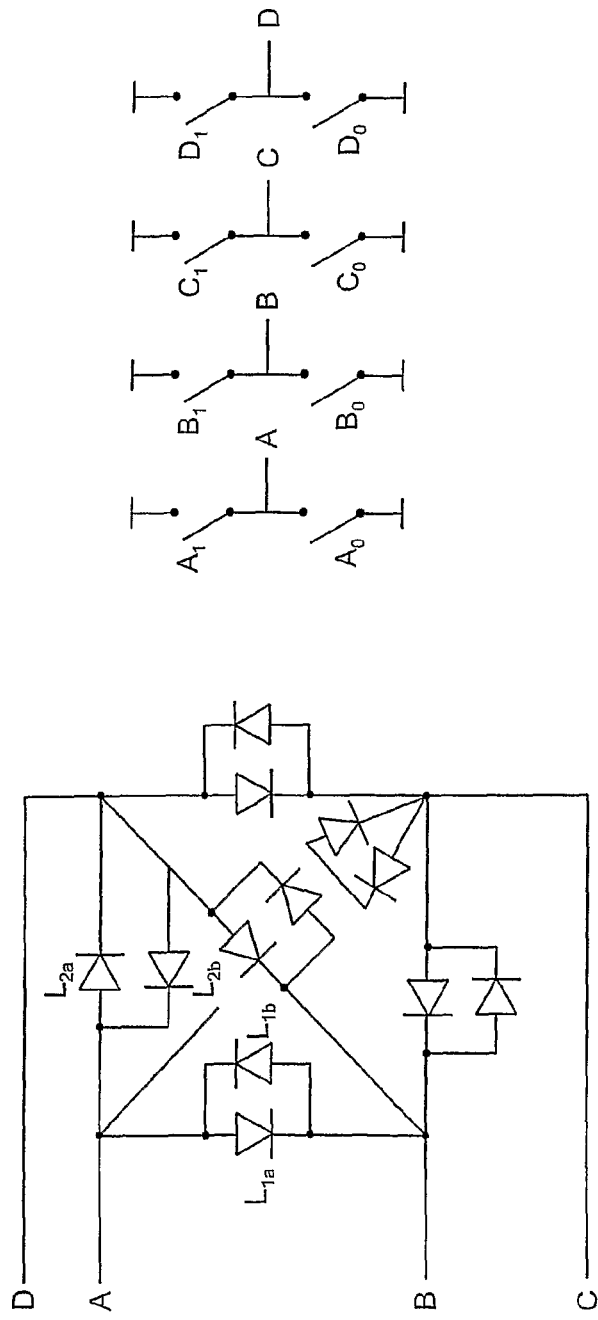
FIG. 9b shows a twelve section backlight driven by 4 wires of the present invention.

In a second implementation with more than two sections, diagonal bridge drive is used. In FIG. 9b, 4 wires are able to select 1 of 12 sections, 5 wires can drive 20 sections, and 6 wires drive 30 sections.

Figure 9C:
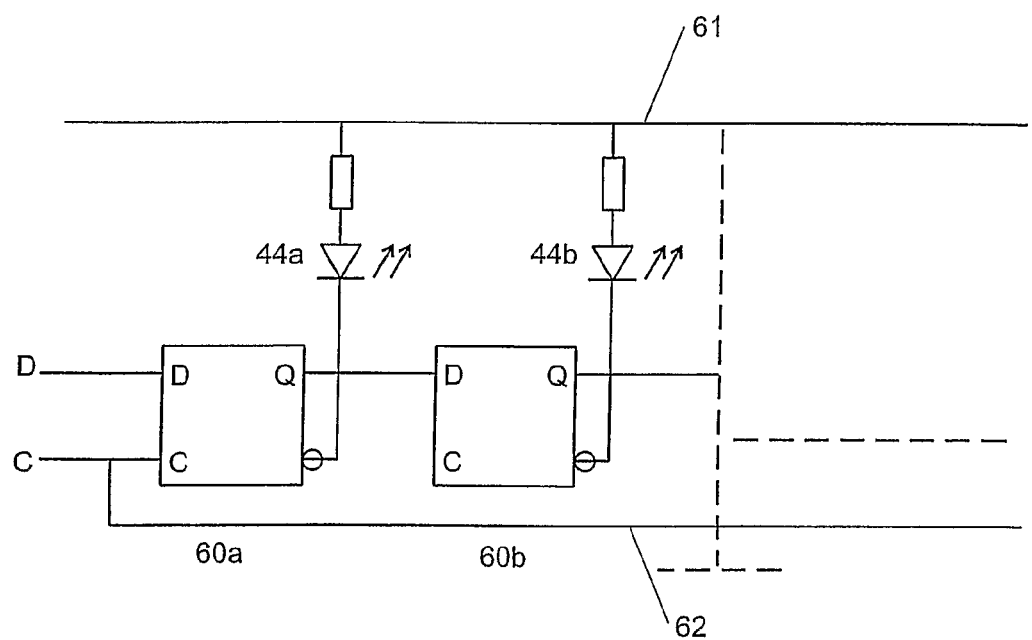
FIG. 9c shows a piece of distributed shift register backlight of the present invention.

In a third implementation shown in FIG. 9c, for a large number of sections, a shift register 60 is physically distributed around the backlight, and only two control lines are required.

X-Y multiplexing arrangements are well known in the art. For example an 8+4 wires are used to control a 4 digit display with 32 LED's. FIG. 9b shows a 4 wire diagonal multiplexing arrangement with 12 LEDs. The control lines A, B, C, D are driven by tristate outputs such as are commonly found at the pins of microprocessors such as the Microchip PIC family. Each tristate output has two electronic switches which are commonly mosfets. Either or neither of the switches can be turned on. To operate led L1a, switches A1 and B0 only are enabled. To operate L1B, A0 and B1 are operated. To operate L2a, A1 and D0 are enabled, and so on. This arrangement can be used with any number of control lines, but is particularly advantageous for the cases of 4, 5, 6 control lines, where 12, 20, 30 LEDs can be controlled whilst the printed circuit board tracking remains simple. Where higher control numbers are used it may be advantageous to use degenerate forms where some of the possible LEDs are omitted to ease the practical interconnection difficulties.

The diagonal multiplexing system has the following features it is advantageous where there are 4 or more control lines; it requires tri-state push-pull drivers on each control line; rather than using an x-y arrangement of control lines with led's at the crossings, the arrangement is represented by a ring of control lines with a pair of antiphase LED's arranged on each of the diagonals between the control lines. Each LED can be uniquely selected, and certain combinations can also be selected; and it uses the minimum possible number of wires where emc filtering is needed on the wires there is a significant saving in components.

The above examples referred to various illumination sources and it should be understood that any suitable radiation source can be used. For instance, light emitting diodes (LEDs) may be used to generate infrared (IR) radiation that is directed over one or more optical paths in the detection plane. However, other portions of the EM spectrum or even other types of energy may be used as applicable with appropriate sources and detection systems.

Several of the above examples were presented in the context of a touch-enabled display. However, it will be understood that the principles disclosed herein could be applied even in the absence of a display screen when the position of an object relative to an area is to be tracked. For example, the touch area may feature a static image or no image at all. Accordingly, the display may be viewed as one of a plurality of potential "touch surfaces." Other examples of touch surfaces include bodies separate from a display which are used for input purposes (e.g., a body positioned in view of one or more cameras for touch detection purposes).

Additionally, in some embodiments a "touch detection" system may be more broadly considered a "coordinate detection" system since, in addition to or instead of detecting touch of the touch surface, the system may detect a position/coordinate above the surface, such as when an object hovers but does not touch the surface. Thus, the use of the terms "touch detection," "touch enabled," and/or "touch surface" is not meant to exclude the possibility of detecting hover-based or other non-touch input.

Additional Illustrative Embodiments and Embodiments of Single-Point Calibration

Figure 10A:
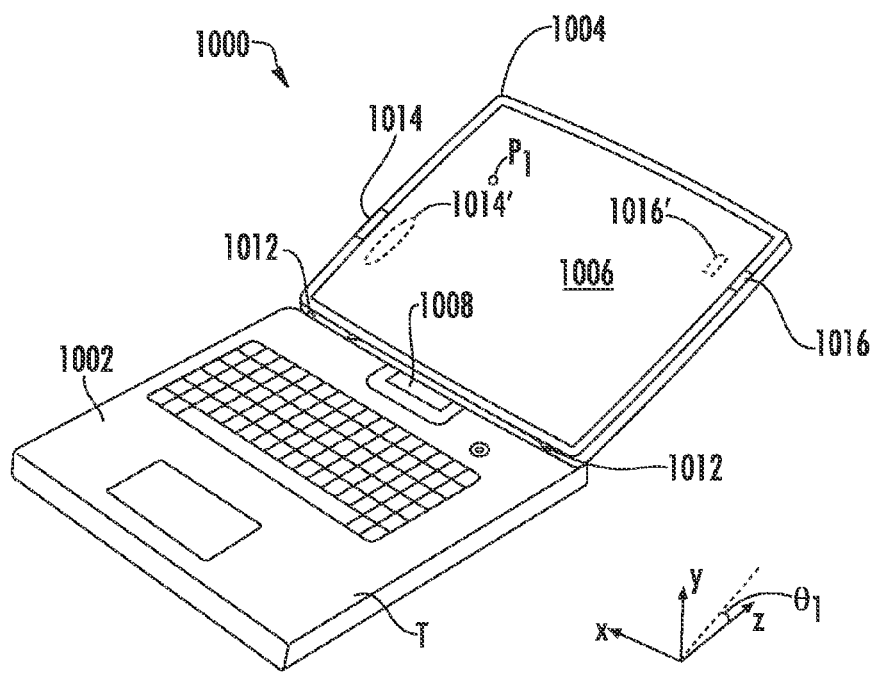
FIGS. 10A-10B show an embodiment of a position detection system featuring a single camera remote from a body featuring the touch surface.
Figure 10B:
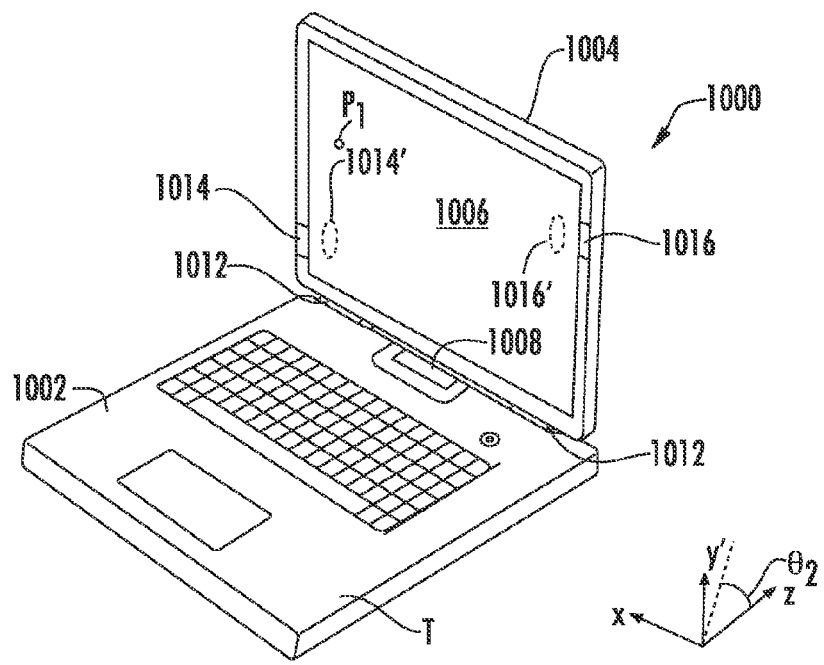

FIGS. 10A-10B show an embodiment of a position detection system 1000 featuring a single camera remote from a body featuring the touch surface. Although a single camera is shown in this example, other embodiments, such as system 1001 of FIGS. 10C-10D, may use multiple cameras. In both examples, the coordinate detection system comprises a processing unit 1002 that comprises one or more processors and a computer-readable medium. For example, the processing unit may comprise a microprocessor, a digital signal processor, or microcontroller configured to drive components of the coordinate detection system and detect input based on one or more program components in RAM, ROM, or other memory comprising a computer-readable medium and/or by accessing stored code (e.g., from a disk).

Processing unit 1002 forms a part of a laptop computer and features a keyboard, trackpad, and power button. A display unit 1004 carries a touch surface 1006, which in these examples comprises a display interfaced to the processor and other components of processing unit 1002. Two hinges 1012 connect processing unit 1002 and display unit 1004, allowing display unit 1004 to serve as a lid for processing unit 1002. Other hinge arrangements could be used, of course. Systems 1000 and/or 1001 may each, for example, comprise a laptop, tablet, or "netbook" computer. However, system 1000/1001 may comprise a mobile device (e.g., a media player, personal digital assistant, flip-phone or other telephone form, etc.), or another computing system that includes one or more processors configured to function by program components.

Figures 10C, 10D:
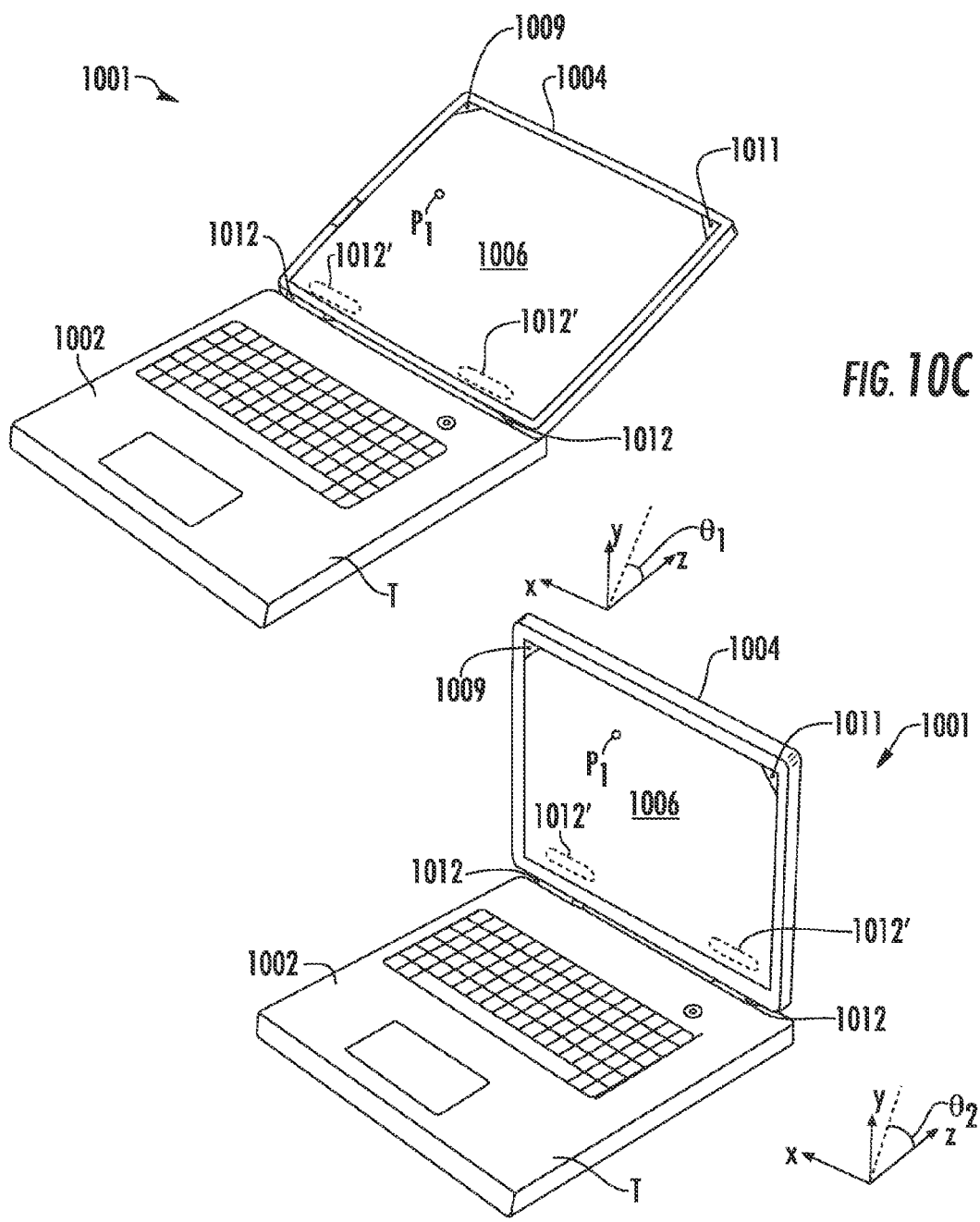
FIGS. 10C-10D show an embodiment of a position detection system featuring cameras mounted to a body featuring the touch surface.

Coordinate detection system 1000/1001 includes at least one imaging device. In the example of FIGS. 10A-10B, a single camera 1008 is positioned on top surface T of processing unit 1002 in order to image some or all of the area of touch surface 1006. In the example of FIGS. 10C-10D, two cameras 1009 and 1011 are positioned on display unit 1004 at the corners thereof. It will be understood that other camera arrangements could be used, including, but not limited to, a single camera clipped or attached to display unit 1004 or multiple cameras 1008 on top surface T. Other embodiments can use a combination of cameras mounted to top surface T and display unit 1004.

Touch surface 1006 may correspond to the top surface of the screen or a material or element positioned above the screen to protect the screen from damage and/or to serve other purposes. In this example, the touch surface corresponds to a display, but the same principles could apply to detecting position of an object relative to a surface that is not a display. Touch surface 1006 can comprise any suitable material, preferably a material with reflective properties at least in the range of light used by the camera(s) of the position detection system.

Processing unit 1002 can be configured to utilize one or more cameras to image one or more objects and determine the position of the object(s) relative to touch surface 1006. For example, triangulation techniques can be used with multiple cameras or other suitable position detection algorithms can be utilized. In some embodiments, a mirror image of the object can be used in such determinations. Regardless of how the position of the object is determined, a frame of reference will be needed in order to use data from the camera(s) in position detection.

As an illustration, FIG. 10A shows display unit 1004 of system 1000 in a first orientation relative to processing unit 1002, while in FIG. 10B the display unit is in a second orientation. Similarly, display unit 1004 of system 1001 is in a first orientation in FIG. 10C and in a second orientation in FIG. 10D. A plane corresponding to touch surface 1006 meets the x-z plane at angle $\Theta_1$ in FIGS. 10A/10C, while in FIGS. 10B/D the plane of touch surface 1006 meets the x-z plane at an angle $\Theta_2$.

In FIGS. 10A-10B, assuming top surface T of processing unit 1002 is in the x-z plane, coordinates detected by camera 1008 may be found in terms of distance, bearing, and inclination from the x-z plane. However, depending upon the orientation of display 1004, the coordinates could have different meanings. For instance, a hover gesture may be triggered based on determining a user's finger or another object is within a given distance from the screen. Thus, the orientation of the screen would need to be known to make use of the distance/bearing/inclination to determine a position relative to the surface.

In FIGS. 10C-10D, the relative position of touch surface 1006 to processing unit 1002 may not be needed for coordinate detection, but an initial calibration may be needed in order to determine where the surface lies in order to interpret input. Additionally, if touch surface 1006 were elsewhere from the display, the plane of the touch surface would be needed.

As noted above with regard to FIG. 5, a three-touch calibration can be performed in order to ascertain the plane of touch surface 1006, since a plane can be defined by three points. However, the multiple-touch routine may become tiresome for a user. For example, in an embodiment such as FIGS. 10A-10B, each time the position of a notebook computer's display is adjusted, the calibration routine would need repeating.

Some presently-disclosed embodiments can utilize a simpler calibration routine. Rather than relying on three touch points, a single-touch calibration sequence can be supported, such as by integrating the single-touch calibration sequence into a background process. This can allow for real-time updates to calibration, which may be especially advantageous when a relative position of a touch surface and imaging camera(s) is likely to change, such as in the examples of FIGS. 10A-10B. However, the same routine can allow for simpler calibration of systems in which one or more cameras move with the touch surface, such as in FIGS. 10C-10D.

In accordance with the present subject matter, in some embodiments the position detection system is configured to access data regarding one or more physical or other features at known locations relative to the touch surface. This data can be used along with sensor information to reduce the number of touches required to obtain the three points used to define a plane corresponding to touch surface 1016.

Figure 11:
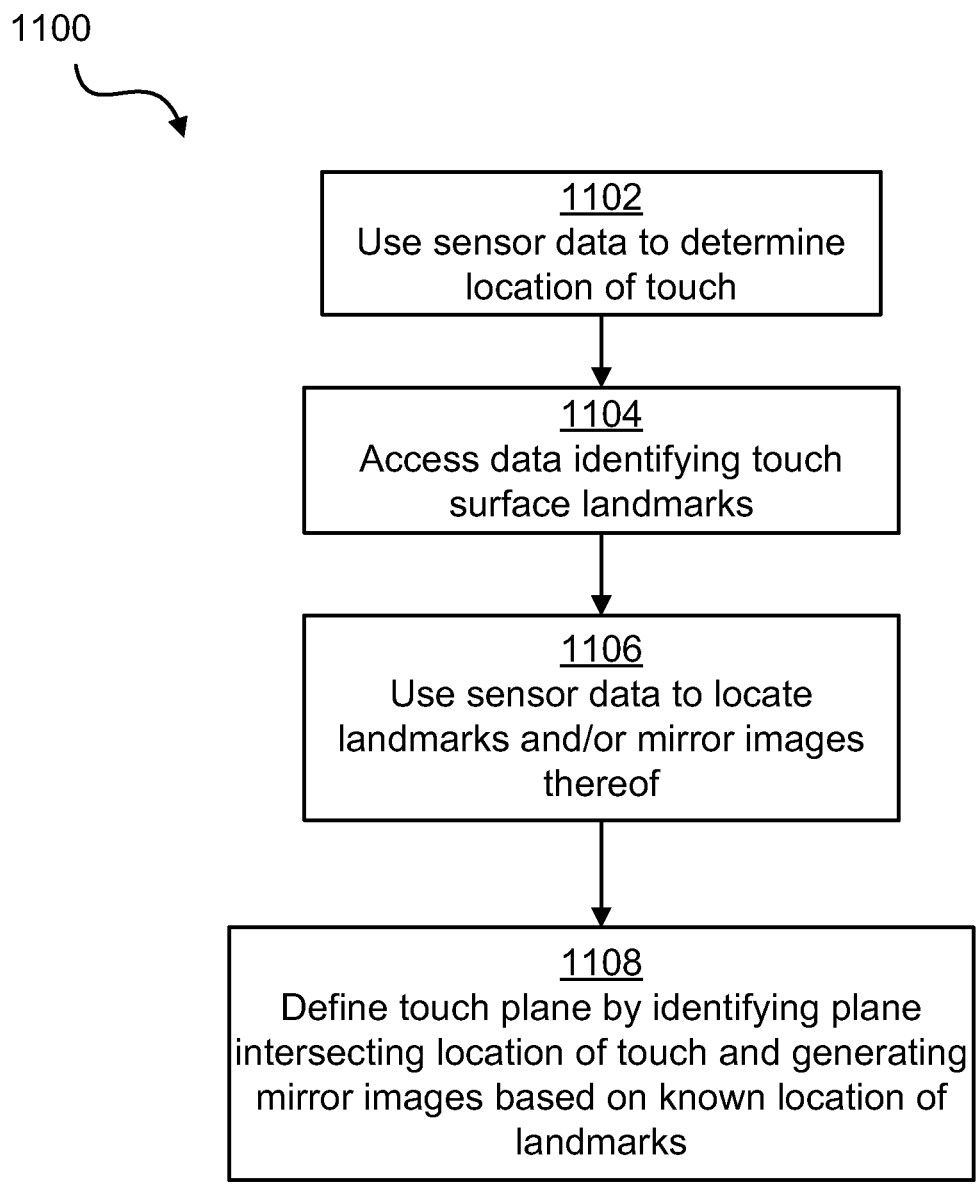
FIG. 11 is a flowchart showing exemplary steps in a method of single-touch calibration.

FIG. 11 provides an example of a method 1100 of single-touch calibration. The method may be carried out by one or more software routines, such as a system driver in a computing device featuring one or more cameras. As another example, the method may be carried out by dedicated image processing hardware (e.g., a digital signal processor or microcontroller associated with the position detection system).

Block 1102 represents using sensor data to determine a location of a touch. In FIGS. 10A-10D, a point P1 is illustrated to represent a point at which an object touches the screen. For example, a user of the device may be prompted to touch the screen at a particular location, or at any location. As another example, if the calibration is carried out on an ongoing basis, various interactions with the device can be tracked and used as a basis for updating a coordinate system. In some embodiments, occurrence of the touch can be identified by tracking motion of an interruption in light (and/or motion of light reflected from an object into the camera) until the tracked motion coincides with another tracked motion. For instance, as noted above, the touch point may correspond to a point at which an image and its mirror image coincide.

Block 1104 represents accessing data identifying one or more touch surface "landmarks," which can include any feature that can be imaged by the camera(s) and is at a known position relative to the touch surface. The feature(s) may be features of a body comprising the touch surface or another feature visible to the camera(s).

For instance, in FIGS. 10A-10B, modifications have been made to the bezel of display unit 1004 as shown at 1014 and 1016. The modifications may include bumps, tabs, or other protrusions or changes in the bezel shape, and are shown in a somewhat exaggerated view in FIGS. 10A-10B. The modifications may touch surface 1016 or may be positioned near touch surface 1016 but may not actually touch the surface. As can be seen at 1014' and 1016', however, the modifications do create mirror images in touch surface 1016.

FIGS. 10C-10D do not feature modifications, but illustrate an embodiment in which other physical features of the position detection system are used in the calibration sequence. Particularly, hinges 1012 are at a known location relative to display unit 1004 and create mirror images 1012'. As noted below, however, some embodiments can utilize the landmarks themselves and may not need to image both landmarks and mirror images thereof.

Information about the relative position of the physical features can be used to infer one or more calibration touch points in order to establish a plane corresponding to touch surface 1016. Returning to FIG. 11, block 1104 can represent accessing data indicating an expected location of a physical feature. For example, data accessed by the calibration routine may indicate an expected range of pixel addresses for registering an image of modification 1014 and its mirror image 1014', and/or data identifying a known position of modification 1014 relative to surface 1016. Similarly, expected coordinates for hinges 1012 may be provided.

In some embodiments, no specific data regarding expected locations is needed. For example, the knowledge of the expected features can simply be a part of the algorithm carrying out the routine to detect the position of the plane.

Block 1106 represents using sensor data to locate landmarks and/or mirror images thereof. For example, camera 1008 of FIGS. 10A-10B or cameras 1109/1111 of FIGS. 10C-10D can be used to sample light reflected from surface 1006 and other light traveling in a space above surface 1006 (assuming no touches occurring during the sample). In FIGS. 10A-10B, for example, the image will include four items: direct images of two hinges 1012 and their mirror images 1012'. In FIGS. 10C-10D, the image will include direct images of modifications 1014 and 1016 along with mirror images 1014' and 1016'.

At this stage, the plane of touch surface 1006 is not known, so the landmarks and their respective mirror images may not be discernable from one another—in the image, they simply appear as four objects. However, the calibration routine can work based on the fact that the landmarks and mirror images thereof about a reflection plane are known to have been detected. The plane of touch surface 1006 will be the plane that includes touch point P1 and also corresponds to a plane of reflection that would produce the pairs of landmarks and mirror images as detected. The calibration routine may, for example, determine a plurality of coordinate sets for the objects and identify one or more potential planes that would result in two of the objects being "real" and two objects being "virtual." The true plane can be found amongst the potential planes by determining which potential plane also would include the detected touch point.

As another example, the landmarks may be formed to intersect with the reflection plane. The plane of touch surface in that case would be a plane that includes the landmarks and the single touch point. Accordingly, embodiments include calibration using features that are reflected in, but do not touch, the touch surface or can be used with landmarks shaped to contact and/or be coplanar with the touch surface.

Figure 12:
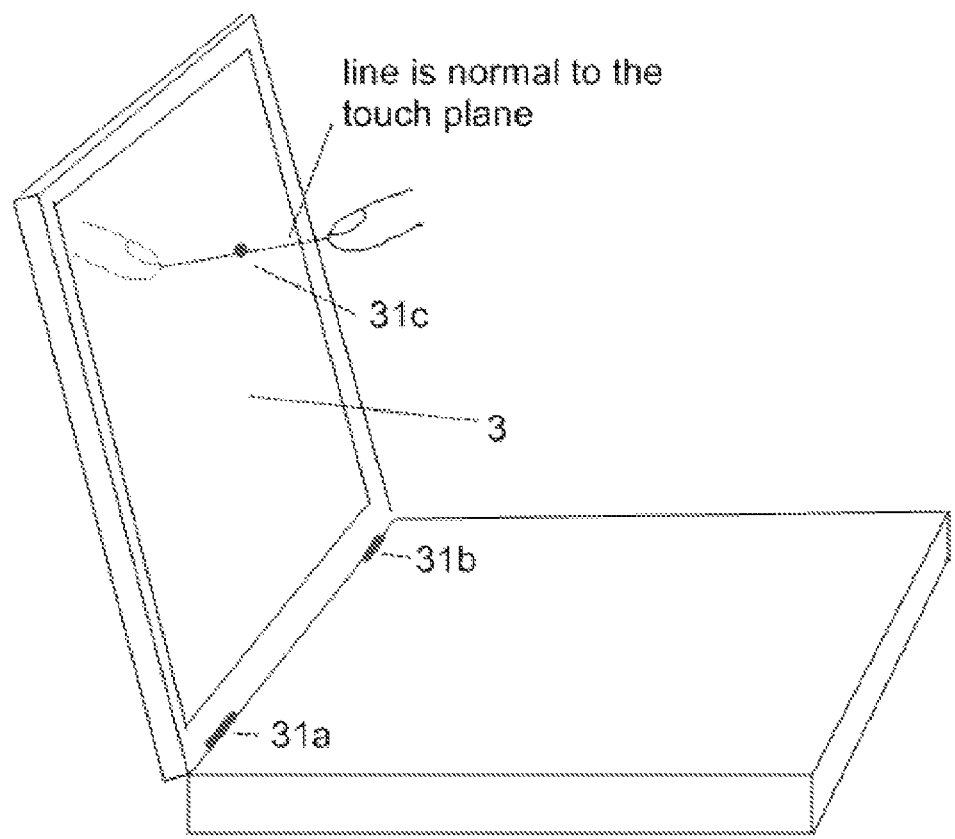
FIG. 12 is an illustration of calibration in another preferred embodiment of the present invention.

As one example of the latter, the plane of touch surface could be figured out by determining 3 non collinear points 31a, 31b, 31c, as shown in FIG. 5 or FIG. 12. FIG. 12 depicts the touch screen panel 3 of FIG. 5 and three non collinear points, but in this example two of the non collinear points are features of the display (hinges, in this example). The known non collinear points can be identified in the image and, along with the single touch, can be used to define the touch plane of the touch panel 3.

The single touch may not even need to contact the display in order to determine the "touch point." For example, in the case of a notebook or netbook shown in FIGS. 10A-10D, two of the three non collinear points can be determined from the fixed hinge positions or other landmarks and the other point (i.e. the "touch point") determined as being the point laying on the line halfway between the object and its mirror image on the touch surface.

As another example, the touch plane can be determined solely from the object moving toward the single "touch point" and the object's mirror image, as the line connecting the two is normal to the touch plane and the mid point along this line lies on the plane as shown in FIG. 12. The plane normal and this point on the touch plane fully define the touch plane.

Regardless of how the three points are determined, any suitable technique can be used to actually determine the plane. For example, let $p_1=(x_1, y_1, z_1)$, $p_2=(x_2, y_2, z_2)$, and $p_3=(x_3, y_3, z_3)$ be non-collinear points.

In one method, the plane passing through $p_1$, $p_2$, and $p_3$ can be defined as the set of all points (x,y,z) that satisfy the following determinant equations:

$$\begin{vmatrix} x-x_1 & y-y_1 & z-z_1 \\ x_2-x_1 & y_2-y_1 & z_2-z_1 \\ x_3-x_1 & y_3-y_1 & z_3-z_1 \end{vmatrix} = \begin{vmatrix} x-x_1 & y-y_1 & z-z_1 \\ x-x_2 & y-y_2 & z-z_2 \\ x-x_3 & y-y_3 & z-z_3 \end{vmatrix} = 0.$$

As another example, to describe the plane as an equation in the form ax+by+cz+d=0, solve the following system of equations:

$$ax_1+by_1+cz_1+d=0$$

$$ax_2+by_2+cz_2+d=0$$

$$ax_3by_3+cz_3+d=0$$

This system can be solved using Cramer's Rule and basic matrix manipulations.

Let $$D = \begin{vmatrix} x_1 & y_1 & z_1 \\ x_2 & y_2 & z_2 \\ x_3 & y_3 & z_3 \end{vmatrix}.$$

Then, $$a = \frac{-d}{D} \begin{vmatrix} 1 & y_1 & z_1 \\ 1 & y_2 & z_2 \\ 1 & y_3 & z_3 \end{vmatrix}$$

$$b = \frac{-d}{D} \begin{vmatrix} x_1 & 1 & z_1 \\ x_2 & 1 & z_2 \\ x_3 & 1 & z_3 \end{vmatrix}$$

$$c = \frac{-d}{D} \begin{vmatrix} x_1 & y_1 & 1 \\ x_2 & y_2 & 1 \\ x_3 & y_3 & 1 \end{vmatrix}.$$

These equations are parametric in d. Setting d equal to any non-zero number and substituting it into these equations will yield one solution set.

Accordingly, block 1108 represents defining the touch plane as the plane that intersects the location of the touch point and also generates proper coordinates for the known location of the landmarks. In practice, the calibration routine can allow for some variance from the ideal mathematical solution, such as providing for a margin of error in the plane definition.

Although the examples above referred to single-touch calibration, the same principles could be used in a calibration sequence based on two touches, such as by using two touches and one landmark or by using multiple touches and landmarks to ensure greater precision. Additionally, inferring a plane based on the landmarks may be used in other contexts—for example, a triangulation-based position detection algorithm may rely on a four-point calibration sequence to determine bearings relative to two cameras (e.g., cameras arranged as in FIGS. 10C-D). Two of the four points may be inferred based on the landmarks in some embodiments.

Figure 13:
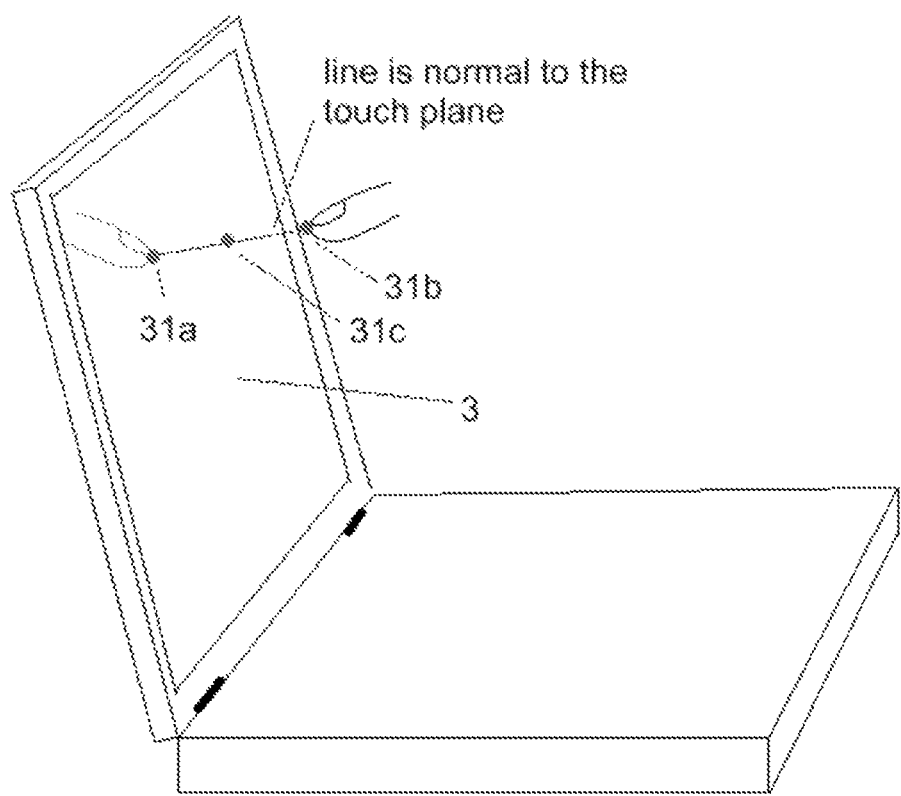
FIG. 13 is an illustration of calibration in yet another preferred embodiment of the present invention.

FIG. 13 illustrates yet another embodiment of single-point calibration. In this example, rather than relying upon landmarks, the plane is determined solely from the object moving toward the single "touch point" and the object's mirror image. Particularly, this method utilizes the line connecting the object's image and its mirror image, which is normal to the touch plane, and the mid point along this line (which corresponds to the touch point and thus lies on the plane). As can be seen in FIG. 13, the plane' normal (line from a point 31*a* of the object and a corresponding point 31*b* on its mirror image) and this mid point 31*c* on the touch plane fully define the touch plane.

A corresponding method can comprise imaging the object and its mirror image using one or more imaging sensors. Based on the motion of the object and its mirror image, the line (31*a*-31*b*) can be determined, with the midpoint found to define the plane. As is known, in a three-dimensional space, one way of defining a plane is by specifying a point and a normal vector to the plane.

Let $r_0$ be the position vector of some known point $P_0$ in the plane, and let n be a nonzero vector normal to the plane. The idea is that a point P with position vector r is in the plane if and only if the vector drawn from $P_0$ to P is perpendicular to n. Recalling that two vectors are perpendicular if and only if their dot product is zero, it follows that the desired plane can be expressed as the set of all points r such that $$N(\text{dot})(r - r_0) = 0$$

which expands to $$n_x(x - x_0) + n_y(y - y_0) + n_z(z - z_0) = 0$$

The various systems discussed herein are not limited to any particular hardware architecture or configuration. As was noted above, a computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions which, when executed by at least one computer, cause the at least one computer to implement one or more embodiments of the methods of the present subject matter.

As an example programming can configure a processing unit of digital signal processor (DSP) or a CPU of a computing system to carry out an embodiment of a method to determine the location of a plane and to otherwise function as noted herein.

When software is utilized, the software may comprise one or more components, processes, and/or applications. Additionally or alternatively to software, the computing device(s) may comprise circuitry that renders the device(s) operative to implement one or more of the methods of the present subject matter.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art

What is claimed:

1. A method for calibrating a coordinate detection system, the method comprising:
    capturing an image above a touch surface positioned on a body, the image captured by at least one camera positioned outside an area defined by the touch surface; and
    identifying, by a processor, a plane corresponding to the touch surface based on at least three points defining the plane, wherein identifying the plane comprises identifying at least one point of the plane by determining a touch point based on tracking an image of an object and a mirror image of the object as reflected by the touch surface.

2. The method set forth in claim 1, wherein the plane is identified using the identified touch point and data in the image corresponding to a point of the object and a mirror image of the point of the object, the point of the object and mirror image of the point of the object defining the plane normal.

3. The method set forth in claim 1, wherein at least one of the at least three points is the midpoint of a line between a point of the object and a mirror image of the point of the object, wherein the line is normal to the plane.

4. The method set forth in claim 1, wherein the plane is identified using the identified touch point and data in the image corresponding to at least two features of the body.

5. The method set forth in claim 4, wherein the at least two features each comprise a tab or protrusion in a bezel surrounding the touch surface.

6. The method set forth in claim 4, wherein the plane is identified using the identified touch point and data in the image corresponding to mirror images of each of the at least two features of the body.

7. The method set forth in claim 1, wherein the at least one camera is positioned on the body.

8. The method set forth in claim 4, wherein the at least one camera is positioned on a second body connected to the body by a plurality of hinges, the plurality of hinges corresponding to the at least two features.

9. The method set forth in claim 1, wherein the processor is configured to identify the plane periodically during operation of a position detection algorithm or during a calibration sequence prior to carrying out a position detection algorithm.

10. A coordinate detection system, comprising:
    a touch surface mounted to or corresponding to a body;
    at least one camera outside an area defined by the touch surface and configured to capture an image above the touch surface;
    an illumination system comprising a light source, the illumination system configured to project light from the light source through the touch surface; and
    a processor configured to execute program code and further configured to identify a plane corresponding to the touch surface based on at least three points defining the plane, wherein identifying the plane comprises identifying at least one point of the plane as a touch point by tracking an image of an object and a mirror image of the object as reflected by the touch surface.

11. The system set forth in claim 10, wherein the plane is identified using the identified touch point and data in the image corresponding to a point of the object and a mirror image of the point of the object, the point of the object and mirror image of the point of the object defining the plane normal.

12. The system set forth in claim 10, wherein at least one of the at least three points is the midpoint of a line between a point of the object and a mirror image of the point of the object, wherein the line is normal to the plane.

13. The system set forth in claim 10, wherein the plane is identified using the identified touch point and data in the image corresponding to at least two features of the body.

14. The system set forth in claim 13, wherein the at least one camera is positioned on a second body connected to the body by a plurality of hinges, the plurality of hinges corresponding to the at least two features.

15. The system set forth in claim 13, wherein the at least two features each comprise a tab or protrusion in a bezel surrounding the touch surface.

16. The system set forth in claim 10, wherein the touch surface corresponds to a display screen or a material positioned above the display screen.

17. The system set forth in claim 10, wherein the at least one camera is positioned on the body.

18. A computer program product comprising a tangible, nontransitory computer-readable medium embodying program code for calibrating a coordinate detection system, the program code comprising:
    code that configures a processing device to capture an image above a touch surface positioned on a body; and
    code that configures the processing device to identify a plane corresponding to the touch surface based on determining a touch point by detecting an image of an object and a mirror image of the object, the plane identified from the touch point and at least two additional points.

19. The computer program product set forth in claim 18, wherein the plane is identified using the touch point and data in the image corresponding to a point of the object and a mirror image of the point of the object, the point of the object and mirror image of the point of the object defining the plane normal.

20. The computer program product set forth in claim 18, wherein at least one of the at least three points is the midpoint of a line between a point of the object and a mirror image of the point of the object, wherein the line is normal to the plane.

21. The computer program product set forth in claim 18, wherein the plane is identified using the identified touch point, data indicating an expected location of at least two features of the body, and data in the image corresponding to images of the at least two features.

22. The computer program product set forth in claim 18, wherein the program code configures the processing device to identify the plane periodically during operation of a position detection algorithm or during a calibration sequence prior to carrying out a position detection algorithm.

23. The computer program product set forth in claim 18, wherein the program code configures the processing device to identify the plane by solving for a plane that includes the touch point and which also corresponds to a plane of reflection between the features of the body and mirror images thereof as detected.

24. The method of claim 1, wherein the plane comprises a surface including each of the three points that is parallel to the touch surface.

25. The method of claim 1, further comprising determining an orientation of the plane with respect to the at least one camera.

26. The method of claim 25, wherein the at least one camera is positioned in an additional plane different from the plane corresponding to the touch surface.

\* \* \* \* \*